(12) United States Patent
Mishra et al.

(10) Patent No.: US 10,733,121 B2
(45) Date of Patent: Aug. 4, 2020

(54) LATENCY OPTIMIZED I3C VIRTUAL GPIO WITH CONFIGURABLE OPERATING MODE AND DEVICE SKIP

(71) Applicant: QUALCOMM Incorporated, San Diego, CA (US)

(72) Inventors: Lalan Jee Mishra, San Diego, CA (US); Radu Pitigoi-Aron, San Jose, CA (US); Richard Dominic Wietfeldt, San Diego, CA (US); Sharon Graif, Zichron Yakov (IL); Lior Amarilio, Yokneam (IL); Kishalay Haldar, Bangalore (IN); Oren Nishry, Bet Lham HaGlilit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/392,264

(22) Filed: Apr. 23, 2019

(65) Prior Publication Data
US 2019/0347225 A1 Nov. 14, 2019

Related U.S. Application Data

(60) Provisional application No. 62/669,872, filed on May 10, 2018.

(51) Int. Cl.
G06F 9/455 (2018.01)
G06F 13/20 (2006.01)
G06F 13/42 (2006.01)

(52) U.S. Cl.
CPC .......... *G06F 13/20* (2013.01); *G06F 13/4291* (2013.01)

(58) Field of Classification Search
None
See application file for complete search history.

(56) References Cited

U.S. PATENT DOCUMENTS 9,122,512 B2 * 9/2015 Gassert ............... G06F 9/45558
2006/0005188 A1 * 1/2006 Vega ..................... G06F 9/5077
718/1

(Continued)

FOREIGN PATENT DOCUMENTS

WO 2017099949 A1 6/2017

OTHER PUBLICATIONS

International Search Report and Written Opinion—PCT/US2019/028860—ISA/EPO—dated Aug. 16, 2019.

*Primary Examiner* — Hyun Nam
(74) *Attorney, Agent, or Firm* — Loza & Loza LLP

(57) ABSTRACT

Systems, methods, and apparatus for communicating virtual GPIO information generated at multiple source devices and directed to multiple destination devices. A method performed at a device coupled to a serial bus includes generating first virtual GPIO state information representative of state of one or more physical GPIO output pins, asserting a request to transmit the first virtual GPIO state information by driving a data line of the serial bus from a first state to a second state after a start code has been transmitted on a serial bus and before a first clock pulse is transmitted on a clock line of the serial bus, transmitting the first virtual GPIO state information as a first set of bits in a data frame associated with the start code, and receiving second virtual GPIO state information in a second set of bits in the data frame.

22 Claims, 20 Drawing Sheets

(56) References Cited

U.S. PATENT DOCUMENTS

| | | | |
|---|---|---|---|
| 2007/0150713 A1* | 6/2007 | Almeida | G06F 9/30101 713/1 |
| 2009/0137318 A1* | 5/2009 | Russo | G06F 13/4291 463/40 |
| 2013/0339948 A1* | 12/2013 | Gassert | G06F 9/45558 718/1 |
| 2013/0339951 A1* | 12/2013 | Gassert | G06F 9/45558 718/1 |
| 2015/0277778 A1* | 10/2015 | Adams | G06F 13/385 710/5 |
| 2017/0075852 A1 | 3/2017 | Mishra et al. | |
| 2019/0347225 A1* | 11/2019 | Mishra | G06F 13/20 |

* cited by examiner

LATENCY OPTIMIZED I3C VIRTUAL GPIO WITH CONFIGURABLE OPERATING MODE AND DEVICE SKIP

PRIORITY CLAIM

This application claims priority to and the benefit of U.S. Provisional Patent Application Ser. No. 62/669,872 filed in the U.S. Patent Office on May 10, 2018, the entire content of this application being incorporated herein by reference as if fully set forth below in its entirety and for all applicable purposes.

TECHNICAL FIELD

The present disclosure relates generally to serial communication and, more particularly, to facilitating communication of virtual GPIO information generated at multiple source devices and directed to multiple destination devices over a serial communication link.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. In some instances, a shared data communication bus may be implemented using a standardized general-purpose serial interface such as the Inter-Integrated Circuit (I2C or I$^2$C) serial bus and the Improved Inter-Integrated Circuit (I3C) interface defined by the Mobile Industry Processor Interface (MIPI) Alliance.

General purpose input/output (GPIO) provided in an integrated circuit (IC) device enable an IC designer to define and configure pins that may be customized for particular applications. For example, a GPIO pin may be programmable to operate as an output or as an input pin depending upon a user's needs. A GPIO module or peripheral may control groups of pins which can vary based on the interface requirement. GPIO pins are commonly included in microprocessor and microcontroller applications because they offer flexibility and programmability. For example, an applications processor in mobile devices may use a number of GPIO pins to conduct handshake signaling such as interprocessor communication (IPC) with a modem or other processor.

In many instances, a number of command and control signals are employed to connect different component devices in mobile communication devices. These connections consume precious general-purpose input/output (GPIO) pins within the mobile communication devices and it would be desirable to replace the physical interconnects with signals carried in information transmitted over existing serial data links. However, the serial data links are associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support low-latency transmissions between peripherals and application processors.

SUMMARY

Certain aspects of the disclosure relate to systems, apparatus, methods and techniques that can facilitate communicating virtual GPIO information generated at multiple source devices and directed to multiple destination devices.

In various aspects of the disclosure, a method performed at a device coupled to a serial bus, includes generating first virtual GPIO state information representative of state of one or more physical GPIO output pins, asserting a request to transmit the first virtual GPIO state information by driving a data line of the serial bus from a first state to a second state after a start code has been transmitted on a serial bus and before a first clock pulse is transmitted on a clock line of the serial bus, transmitting the first virtual GPIO state information as a first set of bits in a data frame associated with the start code, and receiving second virtual GPIO state information in a second set of bits in the data frame.

In one aspect the method includes modifying state of at least one physical GPIO input pin based on the second virtual GPIO state information.

In certain aspects, the method includes determining a mode for transmitting the first virtual GPIO state information in a data frame based on a mode field transmitted on the serial bus after the request to transmit the first virtual GPIO state information has been asserted. The mode may determine whether one or more sources of virtual GPIO state information are skipped, whether mask information is included in the transmission, and/or whether extended mode information is transmitted.

In various aspects of the disclosure, an apparatus has a plurality of physical GPIO pins, an interface adapted to couple the apparatus to a serial bus, and a processing circuit. The processing circuit may be configured to cause the interface to assert a request to transmit first virtual GPIO state information by driving a data line of the serial bus from a first state to a second state after a start code has been transmitted on a serial bus and before a first clock pulse is transmitted on a clock line of the serial bus, transmit the first virtual GPIO state information as a first set of bits in a data frame associated with the start code, and receive second virtual GPIO state information in a second set of bits in the data frame. The processing circuit may include a finite state machine configured to generate the first virtual GPIO state information based on state of one or more physical GPIO output pins, and/or to modify state of at least one physical GPIO input pin based on the second virtual GPIO state information.

In various aspects of the disclosure, a processor-readable storage medium is disclosed. The storage medium may be a non-transitory storage medium and may store code and/or instructions that, when executed by one or more processors, causes the one or more processors to generate first virtual GPIO state information representative of state of one or more physical GPIO output pins, assert a request to transmit the first virtual GPIO state information by driving a data line of a serial bus from a first state to a second state after a start code has been transmitted on a serial bus and before a first clock pulse is transmitted on a clock line of the serial bus, transmit the first virtual GPIO state information as a first set of bits in a data frame associated with the start code, and receive second virtual GPIO state information in a second set of bits in the data frame.

In one aspect the first-transmitted bit is set to a second value. The processor-readable storage medium may have instructions that cause the one or more processors to drive the data line of the serial bus from the first state to the second state in a device-skip field provided after the mode field to indicate intent to transmit the first virtual GPIO state information in the data frame, and refrain from driving the data line of the serial bus from the first state to the second state in a device-skip field provided after the mode field to indicate that the first virtual GPIO state information will not be transmitted in the data frame.

In various aspects of the disclosure, an apparatus includes means for generating first virtual GPIO state information representative of state of one or more physical GPIO output pins, means for asserting a request to transmit the first virtual GPIO state information by driving a data line of a serial bus from a first state to a second state after a start code has been transmitted on a serial bus and before a first clock pulse is transmitted on a clock line of the serial bus, means for transmitting the first virtual GPIO state information as a first set of bits in a data frame associated with the start code, and means for receiving second virtual GPIO state information in a second set of bits in the data frame.

In one aspect, the first-transmitted bit is set to a second value and the means for asserting the request drives the data line from the first state to the second state in a device-skip field provided after the mode field to indicate intent to transmit the first virtual GPIO state information in the data frame, and refrains from driving the data line of the serial bus from the first state to the second state in a device-skip field provided after the mode field to indicate that the first virtual GPIO state information will not be transmitted in the data frame.

DETAILED DESCRIPTION

Figure 1:
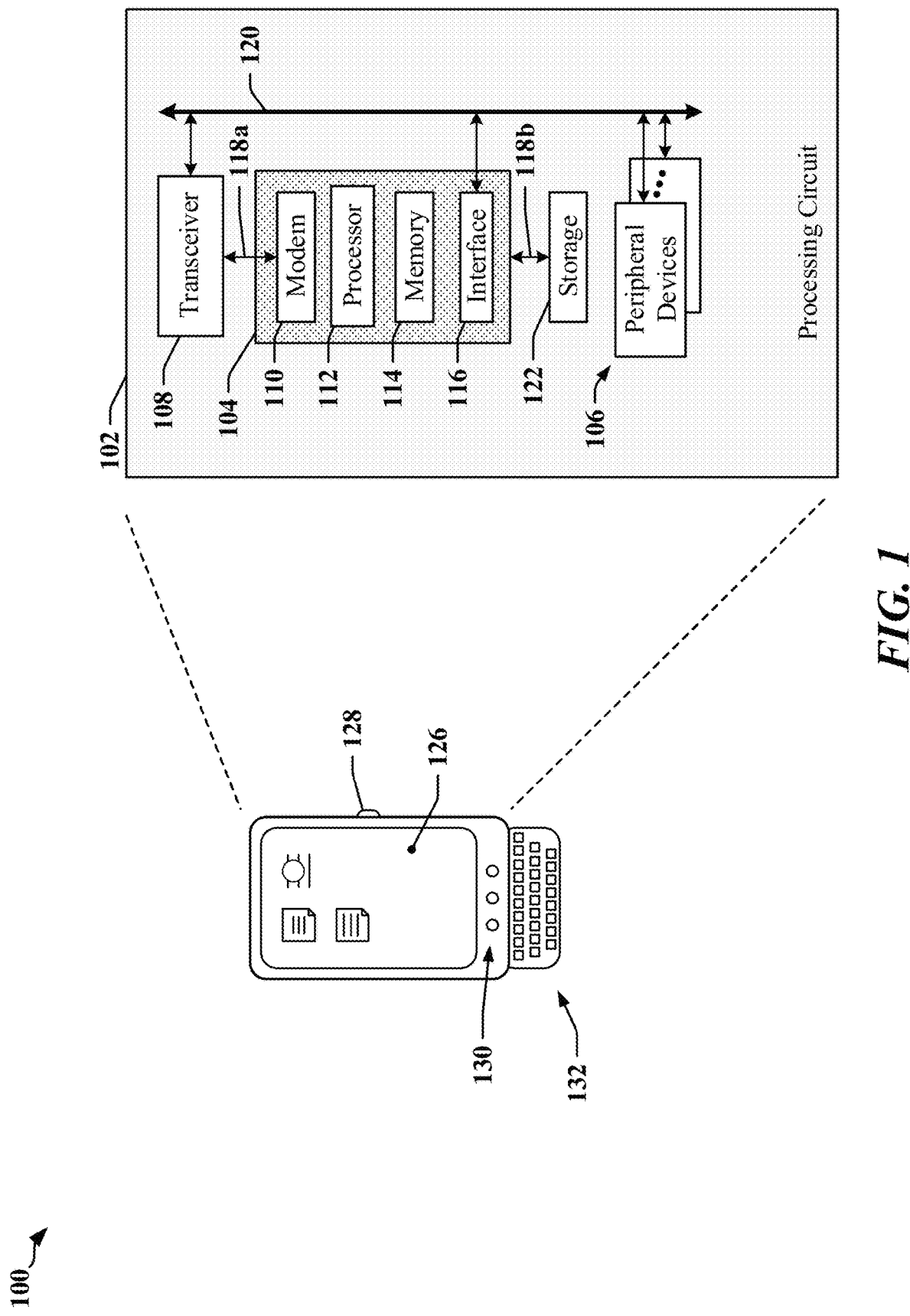
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance with an I2C and/or I3C protocol. According to certain aspects disclosed herein, GPIO pins and signals may be virtualized into GPIO state information that may be transmitted over a data communication link. In resulting reduced input/output (RIO) implementations, virtual GPIO state information may be transmitted over a variety of communication links, including links that include wired and radio communication links. For example, virtual GPIO state information can be packetized or otherwise formatted for transmission over a radio access network, such as a Bluetooth, WLAN, cellular and/or other network. Examples involving wired communication links are described herein to facilitate understanding of certain aspects.

Certain aspects disclosed herein provide adaptations of I3C protocols that enable low-latency GPIO interconnecting three or more devices to be communicated over a common serial bus. Existing protocols have well-defined and immutable structures in the sense that their structures cannot be changed to optimize transmission latencies based on variations in use cases, and/or coexistence with other protocols, devices and applications. It is an imperative of real-time embedded systems that certain deadlines must be met. In certain real-time applications, meeting transmission deadlines is of paramount importance.

Certain aspects disclosed herein relate to communication links, including implementations in which data is serialized and transmitted in accordance with an I3C protocol. Data may be communicated in bits, bytes, characters and/or symbols that can be transmitted in signals transmitted over one or more wires. In a serial interface, for example, data may be serialized to obtain a sequential series of bits in a payload that can be transmitted with link management data that may identify, source, destination and/or nature of the data carried in the payload. Payload data transmitted in a signal over one or more wires of a serial link may be carried in groupings, including frames and/or transactions defined by a protocol. The protocol may prepend additional data to the payload including, for example, header data (e.g. Start bit or Start sequence), bus management data (e.g. identifiers for in-band-interrupts, bus handover, etc. The payload data may be referred to "application data" transmitted from a sender device to receiver device. For example, the payload data may include data generated by a sensor, controller, application, or other component and the payload data may be directed to a different sensor, controller, application, or other component. The payload data may be followed by error protection data (including parity or cyclic redundancy check bits, and terminating and/or footer data including Stop bits or a stop sequence. Management data may be referred to herein as control and command information transmitted to effect management of the bus. Management data may relate to functions such as bus arbitration, in-band-interrupts, as well as commands and signaling used to control modes of operation of the bus, selection of protocols, etc.

In the example of an I3C bus, management data includes Common Command Codes (CCCs) and bits, bytes or words identifying certain bus management functions. A transaction may include management and/or payload data bookended by a preceding Start bit and a terminating Stop bit. A transaction can include multiple frames, where a frame may be a sub-portion of the transaction. For example, payload data may be divided and carried over several frames. In some examples, a frame may include a packet or protocol unit that includes payload data encapsulated in protocol-specific management data, where a transmitting application encapsulates the payload data in management data and a receiving application strips the management data to obtain the payload data.

Certain aspects disclosed herein provide methods, circuits, and systems that are adapted to facilitate communicating virtual GPIO information generated at multiple source devices and directed to multiple destination devices. Each source device may be allocated one or more bit-intervals for transmitting virtual GPIO state information. Receivers of virtual GPIO state information capture relevant virtual GPIO state information in the appropriate bit-intervals. Bits in a skip field corresponding to certain source devices may be used to indicate source devices to be skipped when virtual GPIO state information is transmitted.

In one example, a method performed at a device coupled to a serial bus, includes generating first virtual GPIO state information representative of state of one or more physical GPIO output pins, asserting a request to transmit the first virtual GPIO state information by driving a data line of the serial bus from a first state to a second state after a start code has been transmitted on a serial bus and before a first clock pulse is transmitted on a clock line of the serial bus, transmitting the first virtual GPIO state information as a first set of bits in a data frame associated with the start code, and receiving second virtual GPIO state information in a second set of bits in the data frame. In one aspect the method includes modifying state of at least one physical GPIO input pin based on the second virtual GPIO state information.

In certain aspects, the method includes determining a mode for transmitting the first virtual GPIO state information in a data frame based on a mode field transmitted on the serial bus after the request to transmit the first virtual GPIO state information has been asserted. The mode may determine whether one or more sources of virtual GPIO state information are skipped, whether mask information is included in the transmission, and/or whether extended mode information is transmitted.

Examples of Apparatus that Employ Serial Communication Links

According to certain aspects, a serial communication link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a serial communication bus. The apparatus 100 may include a processing circuit 102 having multiple circuits or devices 104, 106, and/or 108, which may be implemented in one or more application-specific integrated circuits (ASICs) or in an SoC. In one example, the apparatus 100 may be a communication device and the processing circuit 102 may include a processing device provided in an ASIC 104, one or more peripheral devices 106, and a transceiver 108 that enables the apparatus to communicate with a radio access network, a core access network, the Internet, and/or another network.

The ASIC 104 may have one or more processors 112, one or more modems 110, on-board memory 114, a bus interface circuit 116, and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as a display 126, operator controls, such as switches or buttons 128, 130, and/or an integrated or external keypad 132, among other components. A user interface module may be configured to operate with the display 126, external keypad 132, etc. through a dedicated communication link or through one or more serial buses.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic, and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
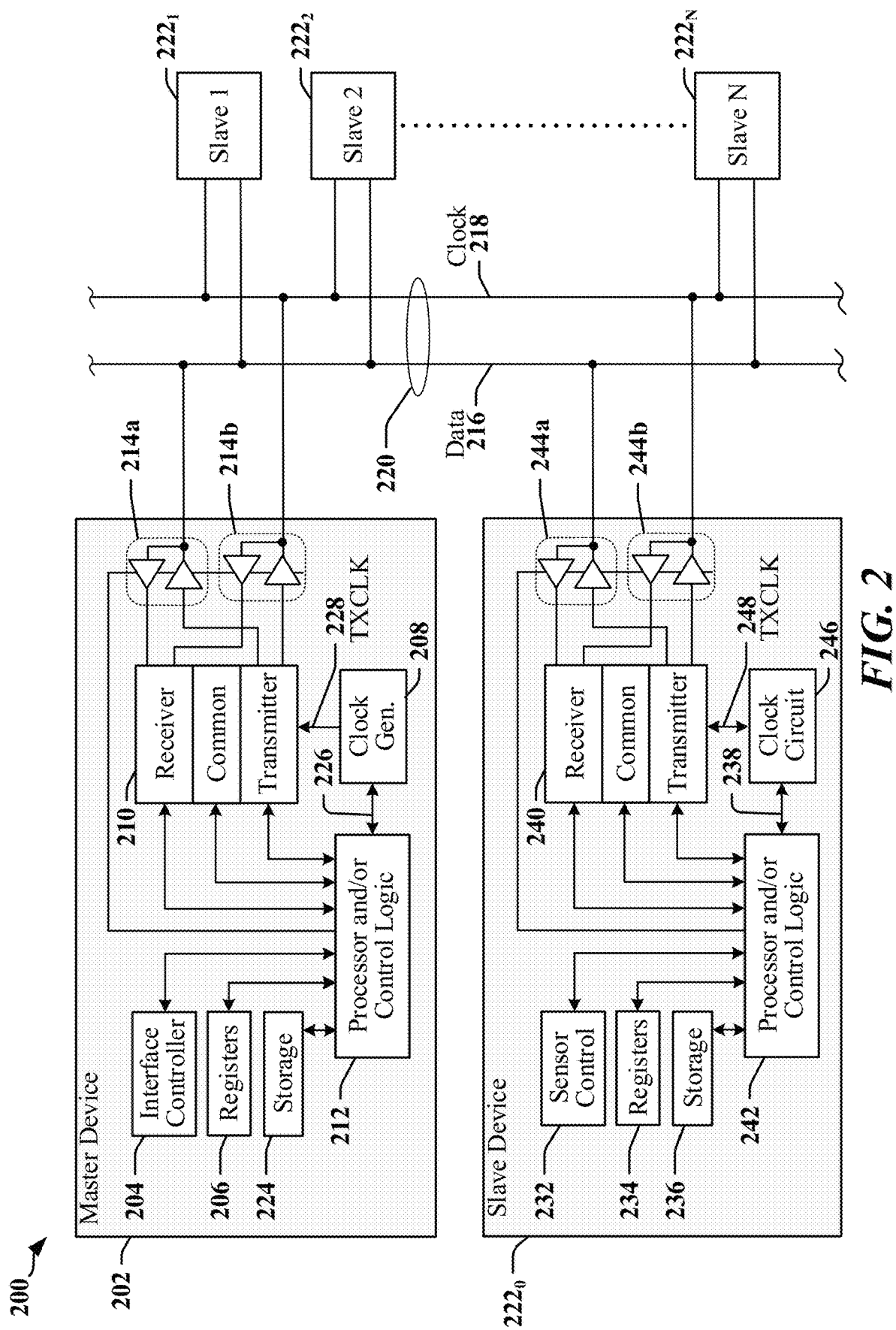
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as applications processors, SoCs or ASICs. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus masters.

In one example, a bus master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The bus master device 202 may include configuration registers 206 or other storage 224, and other control logic 212 configured to handle protocols and/or higher-level functions. The control logic 212 may include a processing circuit such as a state machine, sequencer, signal processor or general-purpose processor. The bus master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with I2C, I3C, SPMI, RFFE, and/or other protocols. A bus master manages communication over the serial bus 220, and typically provides a clock signal that is used to control timing of transmissions. In various examples, one or more devices may be capable of operating as a bus master and devices may contend for control of the serial bus 220 in order to conduct a transaction. In the illustrated example, a bus master device 202 may execute a transaction with one or more slave devices $222_0$-$222_N$ coupled to the serial bus 220.

In an example where the serial bus 220 is operated in accordance with an I3C protocol, devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define certain electrical and timing aspects of signals transmitted on the serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
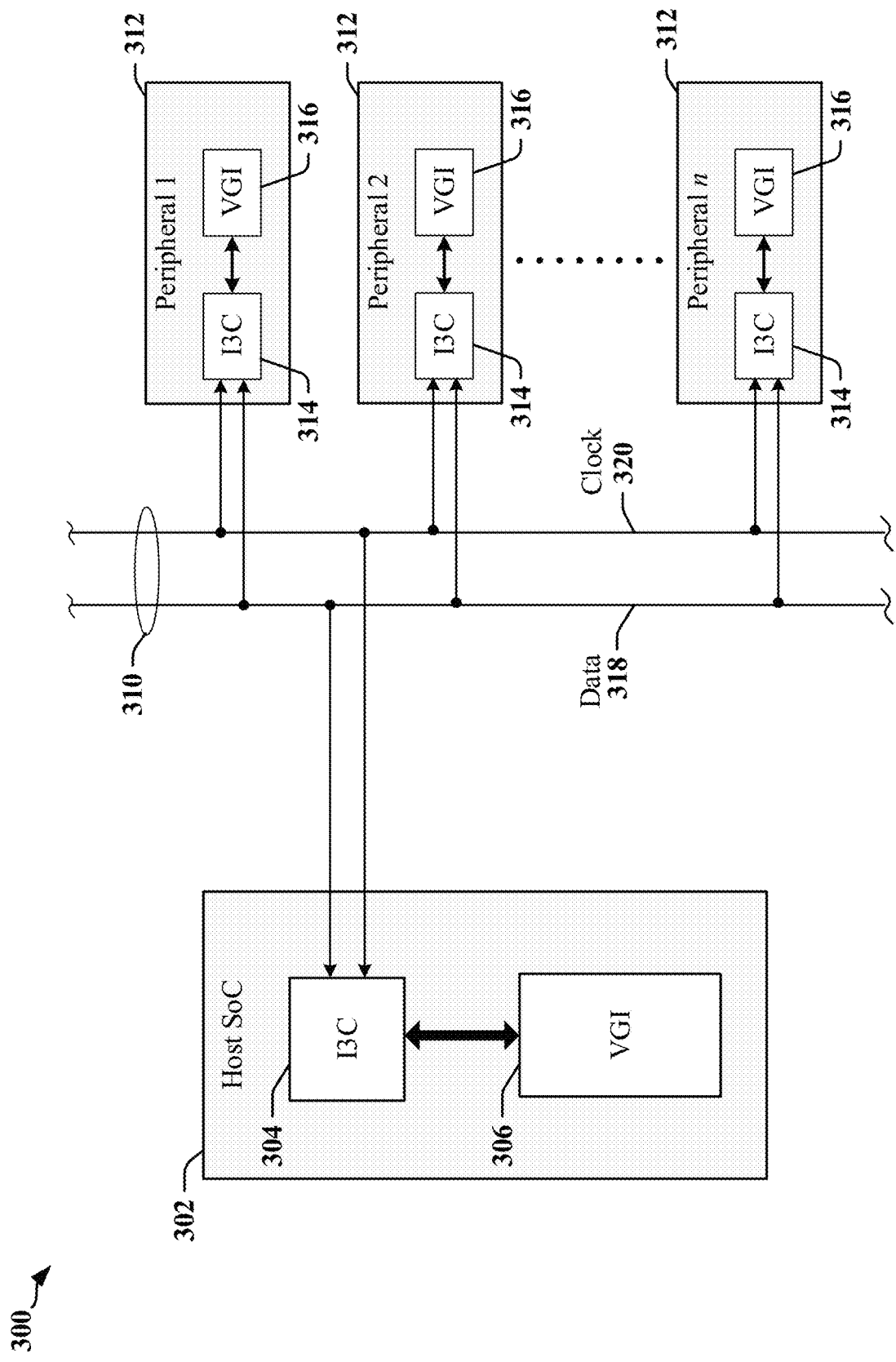
FIG. 3 illustrates a device that employs an I3C bus to couple various front-end devices in accordance with certain aspects disclosed herein.

FIG. 3 illustrates an example of an apparatus 300 that uses an I3C bus to couple various devices including a host SoC 302 and a number of peripheral devices 312. The host SoC 302 may include a virtual GPIO finite state machine (VGI FSM 306) and an I3C interface 304, where the I3C interface 304 cooperates with corresponding I3C interfaces 314 in the peripheral devices 312 to provide a communication link between the host SoC 302 and the peripheral devices 312.

Each peripheral device 312 includes a VGI FSM 316. In the illustrated example, communications between the SoC 302 and a peripheral device 312 may be serialized and transmitted over a multi-wire serial bus 310 in accordance with an I3C protocol. In other examples, the host SoC 302 may include other types of interface, including I2C and/or RFFE interfaces. In other examples, the host SoC 302 may include a configurable interface that may be employed to communicate using I2C, I3C, RFFE and/or another suitable protocol. In some examples, a multi-wire serial bus 310, such as an I2C or I3C bus, may transmit a data signal over a data wire 318 and a clock signal over a clock wire 320.

Virtual GPIO

Figure 4:
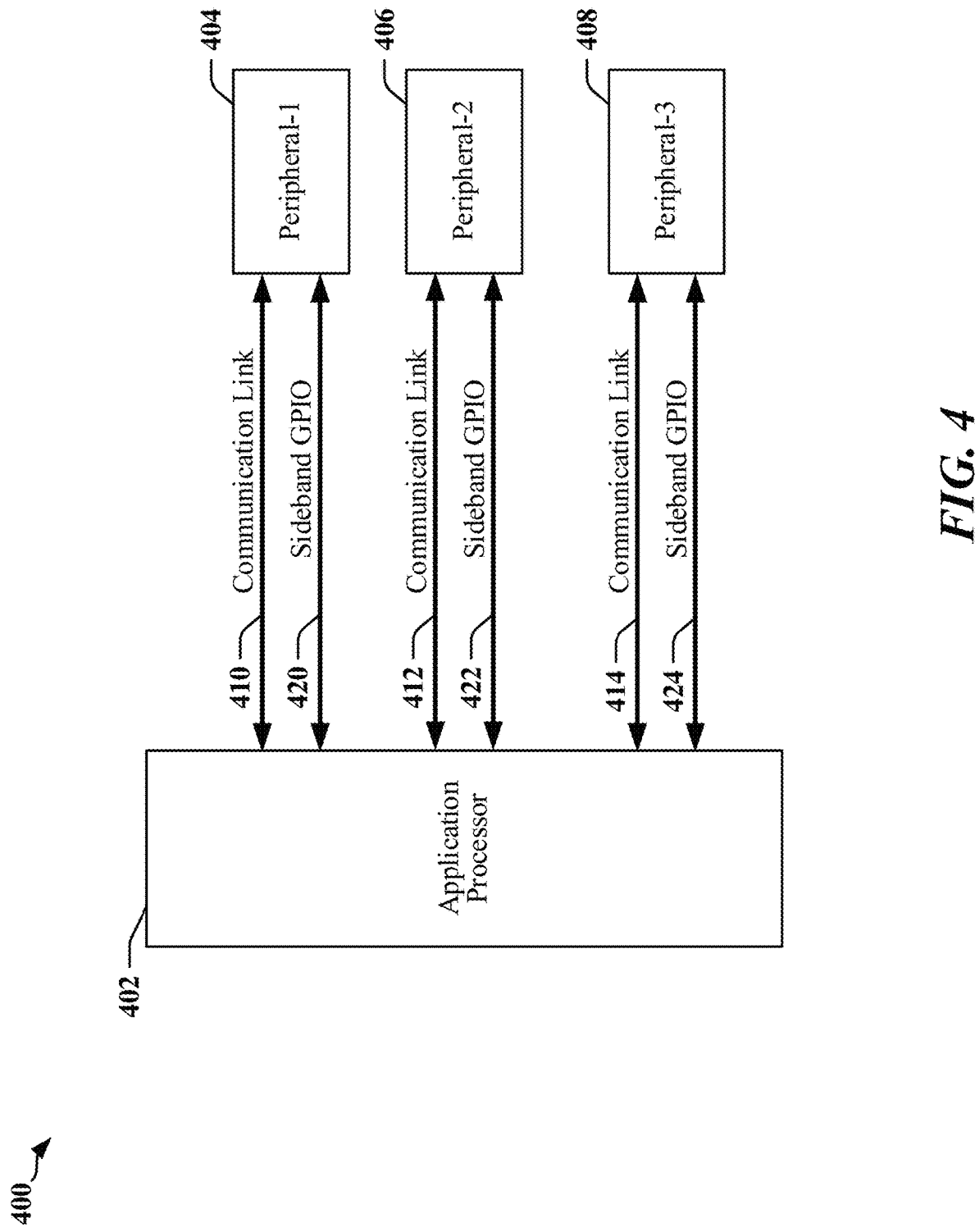
FIG. 4 illustrates an apparatus that includes an Application Processor and multiple peripheral devices that may be adapted according to certain aspects disclosed herein.

Mobile communication devices, and other devices that are related or connected to mobile communication devices, increasingly provide greater capabilities, performance and functionalities. In many instances, a mobile communication device incorporates multiple IC devices that are connected using a variety of communications links. FIG. 4 illustrates an apparatus 400 that includes an Application Processor 402 and multiple peripheral devices 404, 406, 408. In the example, each peripheral device 404, 406, 408 communicates with the Application Processor 402 over a respective communication link 410, 412, 414 operated in accordance with mutually different protocols. Communication between the Application Processor 402 and each peripheral device 404, 406, 408 may involve additional wires that carry control or command signals between the Application Processor 402 and the peripheral devices 404, 406, 408. These additional wires may be referred to as sideband general purpose input/output (sideband GPIO 420, 422, 424), and in some instances the number of connections needed for sideband GPIO 420, 422, 424 can exceed the number of connections used for a communication link 410, 412, 414.

GPIO provides generic pins/connections that may be customized for particular applications. For example, a GPIO pin may be programmable to function as an output, input pin or a bidirectional pin, in accordance with application needs. In one example, the Application Processor 402 may assign and/or configure a number of GPIO pins to conduct handshake signaling or inter-processor communication (IPC) with a peripheral device 404, 406, 408 such as a modem. When handshake signaling is used, sideband signaling may be symmetric, where signaling is transmitted and received by the Application Processor 402 and a peripheral device 404, 406, 408. With increased device complexity, the increased number of GPIO pins used for IPC communication may significantly increase manufacturing cost and limit GPIO availability for other system-level peripheral interfaces.

According to certain aspects, the state of GPIO, including GPIO associated with a communication link, may be captured, packetized, serialized and transmitted over a communication link. In one example, captured GPIO may be transmitted over an I3C bus using common command codes to indicate that an I3C transaction includes packetized GPIO information and/or to select a destination for the packetized GPIO information.

Figure 5:
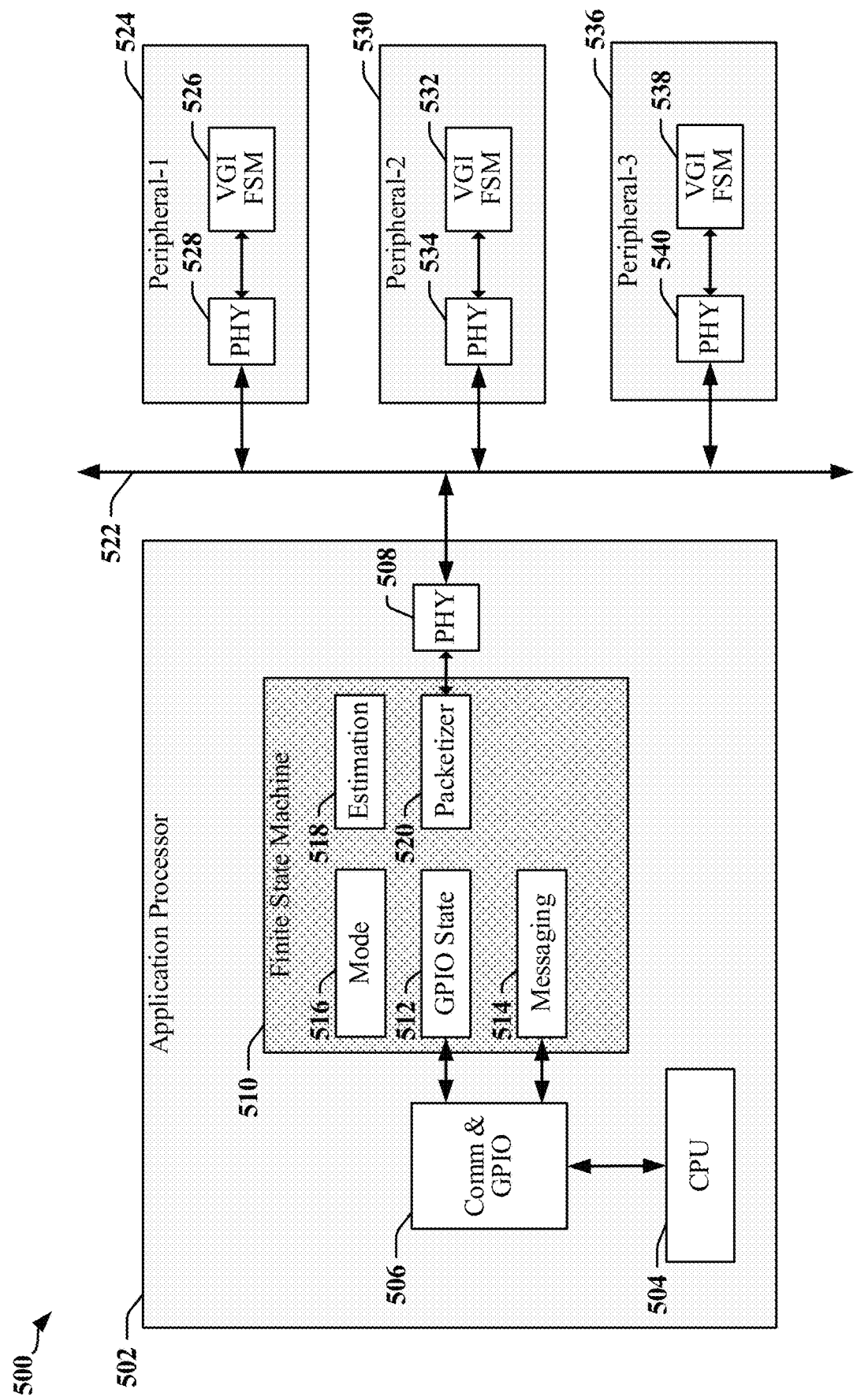
FIG. 5 illustrates an apparatus that has been adapted to support Virtual GPIO in accordance with certain aspects disclosed herein.

FIG. 5 illustrates an apparatus 500 that is adapted to support Virtual GPIO (VGI or VGMI) in accordance with certain aspects disclosed herein. VGI circuits and techniques can reduce the number of physical pins and connections used to connect an Application Processor 502 with one or more peripheral devices 524, 530, 536. VGI enables GPIO state to be virtualized and transmitted in virtual GPIO messages over a communication link 522. In one example, virtual GPIO messages may be transmitted in packets over a communication link 522 that includes a multi-wire bus, such as a serial bus. When the communication link 522 is provided as a serial bus, the receiving peripheral device 524, 530, 536 may deserialize received packets and may extract virtual GPIO messages in packets received from the Application Processor 502. A VGI FSM 526, 532, 538 in the peripheral device 524, 530, 536 may convert the virtual GPIO messages to physical GPIO state of internal GPIO pins.

In another example, the communication link 522 may be provided by a radio frequency transceiver that supports communication using, for example, a Bluetooth protocol, a WLAN protocol, a cellular wide area network, and/or another communication protocol. Virtual GPIO state may be transmitted in packets, frames, subframes, transactions, or other data structures over the communication link 522, and the receiving peripheral device 524, 530, 536 may extract, deserialize and otherwise process received signaling to obtain the virtual GPIO state. Upon receipt of virtual GPIO messages, the VGI FSM 526, 532, 538 or another component of the receiving device may interrupt its host processor to indicate receipt of the messages and/or any changes in physical GPIO state.

In an example in which the communication link 522 is implemented as a serial bus, virtual GPIO messages may be transmitted as payload data in transactions configured for an I2C, I3C, or another standardized serial interface. In the illustrated example, VGI techniques may be employed to accommodate I/O bridging between an Application Processor 502 and one or more peripheral devices 524, 530, 536. The Application Processor 502 may be provided in an ASIC, SoC, or another type of IC device. The Application Processor 502 includes a processor (central processing unit or CPU 504) that generates events and virtual GPIO messages associated with one or more communication channels 506. Virtual GPIO messages produced by the communication channels 506 may be monitored by respective monitoring circuits 512, 514 in a VGI FSM 526, 532, 538. In some examples, a GPIO monitoring circuit 512 may be adapted to produce virtual GPIO messages representative of the state of physical GPIO state and/or changes in the physical GPIO state. In some examples, other circuits are provided to produce the virtual GPIO messages representative of the physical GPIO state and/or changes in physical GPIO state.

An estimation circuit 518 may be configured to estimate latency information for the virtual GPIO messages, and may select a protocol, and/or a mode of communication for the communication link 522 that optimizes the latency for encoding and transmitting the virtual GPIO messages. The estimation circuit 518 may maintain protocol and mode information 516 that characterizes certain aspects of the communication link 522 to be considered when selecting the protocol, and/or a mode of communication. The estimation circuit 518 may be further configured to select a packet type for encoding and transmitting the virtual GPIO messages. The estimation circuit 518 may provide configuration information used by a packetizer 520 to encode physical GPIO state. In one example, the configuration information is provided as a command that may be encapsulated in a packet such that the type of packet can be determined at a receiver. The configuration information, which may be a command, may also be provided to physical layer circuits (PHY 508). The PHY 508 may use the configuration information to select a protocol and/or mode of communication for transmitting the associated packet. The PHY 508 may then generate the appropriate signaling to transmit the packet.

The peripheral device 524, 530, 536 may include a VGI FSM 526, 532, 538 that is configured to process data packets received from the communication link 522. The VGI FSM 526, 532, 538 at the peripheral device 524, 530, 536 may extract messages and may map bit positions in virtual GPIO messages onto physical GPIO pins in the peripheral device 524, 530, 536. In certain embodiments, the communication link 522 is bidirectional, and both the Application Processor 502 and a peripheral device 524, 530, 536 may operate as both transmitter and receiver.

The PHY 508 in the Application Processor 502 and a corresponding PHY 528, 534, 540 in the peripheral device 524, 530, 536 may be configured to establish and operate the communication link 522. Each PHY 508, 528, 534, 540 may be coupled to, or include a transceiver 108 (see FIG. 1). In some examples, the PHY 508, 528, 534, 540 may support a two-wire interface such as an I2C and/or I3C interface at the Application Processor 502 and peripheral device 524, 530, 536, respectively, and virtual GPIO messages may be encapsulated into a packet transmitted over the communication link 522.

VGI tunneling, as described herein, can be implemented using existing or available protocols configured for operating the communication link 522, and without the full complement of physical GPIO pins. Finite state machines 510, 526, 532, 538 may virtualize GPIO state without intervention of a processor in the Application Processor 502 and/or in the peripheral device 524, 530, 536. The use of VGI can reduce pin count, power consumption, and latency associated with the communication link 522.

At a receiving device, virtual GPIO messages are decoded to produce physical GPIO state. Certain characteristics of the physical GPIO pins may be configured using the virtual GPIO messages. For example, slew rate, polarity, drive strength, and other related parameters and attributes of the physical GPIO pins may be configured using the virtual GPIO messages. Configuration parameters used to configure the physical GPIO pins may be stored in configuration registers associated with corresponding GPIO pins. These configuration parameters can be addressed using a proprietary or conventional protocol such as I2C and/or I3C protocols. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

The VGI interface enables transmission of virtual GPIO messages, whereby virtual GPIO messages, application messages, or both can be sent as a serial data stream over a communication link 522. In one example, a serial data stream may be packetized for transmission over an I2C and/or I3C bus in a transaction, which may include a sequence of frames. The presence of virtual GPIO data in an I2C/I3C frame may be signaled using a special command code to identify the frame as a virtual GPIO frame. Virtual GPIO frames may be transmitted as broadcast frames or addressed frames in accordance with an I2C or I3C protocol. The VGI interface may also be referred to as a VGI messaging interface or VGMI.

Figure 6:
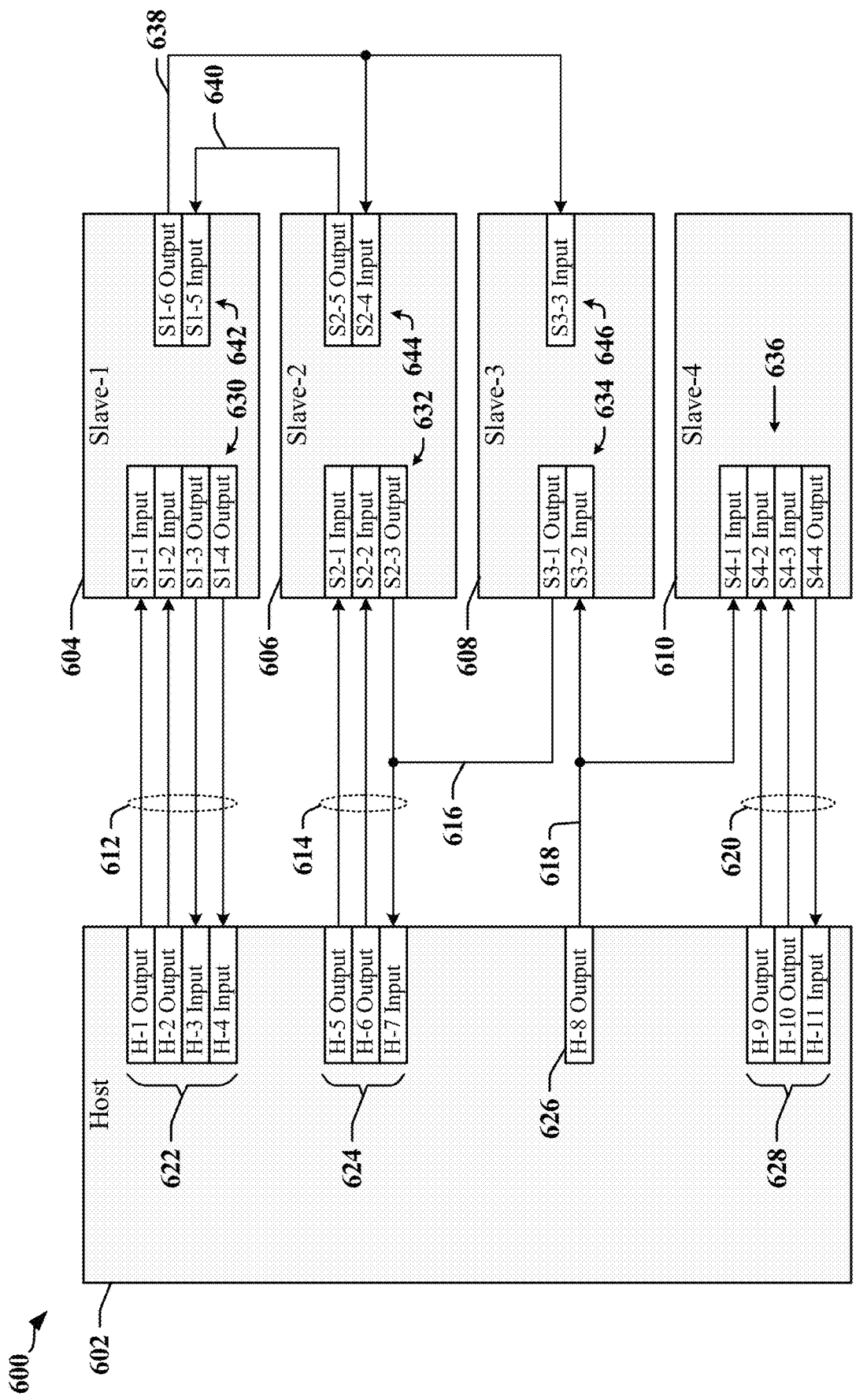
FIG. 6 illustrates a system that employs physical GPIO pins for a variety of purposes.

FIG. 6 illustrates a system 600 that employs physical GPIO pins for a variety of purposes. Although not shown in FIG. 6 (but see FIG. 4), the system 600 may include one or more communication links and certain physical GPIO pins may be assigned to support out-of-band signaling associated with the communication links, while other physical GPIO pins may be used for other purposes. Physical GPIO pins may enable signals to be transmitted over wires of a first configuration of connectors 612, 614, 616, 618, 620, 638, 640 connecting two or more devices 602, 604, 606, 608, 610. The signals may include interrupt signals, chip-select signals, read/write signals, enable/disable signals, ready/not-ready signals, synchronization signals, low-speed serial clock and/or data signals, status signals such as data buffer condition or activity status, and/or coexistence signals indicating when one of a plurality of radio frequency transceivers is actively transmitting or receiving.

The illustrated system 600 includes a host device 602 and multiple slave devices 604, 606, 608, 610. In one example, the host device 602 incorporates an Application Processor 402 (see FIG. 4) configured to service, configure, control and/or support operation of one or more slave devices 604, 606, 608, 610. In another example, the host device 602 may be configured to operate as a bus master on one or more communication links that couple the host device 602 to some or all of the slave devices 604, 606, 608, 610. In FIG. 6, the host device 602 is coupled to each of the slave devices 604, 606, 608, 610.

First host GPIO 622 couples the host device 602 through a first configuration of connectors 612 to corresponding first slave GPIO 630 in a first slave device 604. The first host GPIO 622 may include GPIO pins configured as input, output or bidirectional pins, with corresponding first slave GPIO 630 being configured to match the type of signaling transmitted over connectors in the first configuration of connectors 612. Some GPIO pins may be configured to be placed in a high-impedance state. In one example, the first slave device 604 may include an imaging device or display controller, and image and/or video data may be exchanged through a high-speed communication link 410 (see FIG. 4). In this example, the first host GPIO 622 and first slave GPIO 630 may be include sideband GPIO 420 that enables control signaling in both directions between the host device 602 and the first slave device 604.

Second host GPIO 624 couples the host device 602 through a second configuration of connectors 614 to corresponding second slave GPIO 632 in a second slave device 606. The second host GPIO 624 may include GPIO pins configured as an input, an output or a bidirectional pin. Some GPIO pins may be configured to be placed in a high-impedance state, with corresponding second slave GPIO 632 being configured to match the type of signaling transmitted over connectors in the second configuration of connectors 614. In the illustrated example, a connector 616 coupling the second host GPIO 624 with the second slave GPIO 632 may be connected to third slave GPIO 634 in a third slave device 608. The connector 616 may, for example, carry an interrupt signal and may be driven by open-drain GPIO in the second slave device 606 or third slave device 608.

Third host GPIO 626 couples the host device 602 through a connector 618 to a corresponding GPIO pin of the third slave GPIO 634 in the third slave device 608, and a GPIO pin in fourth slave GPIO 636 in a fourth slave device 610. In one example, the connector 618 may carry a synchronizing signal from the host device 602 to the second slave device 606 and the third slave device 608. In another example, the connector 618 may carry an enable/disable signal from the host device 602 to the second slave device 606 and the third slave device 608. In another example, the connector 618 may carry a select signal used by the host device 602 to select between the second slave device 606 and the third slave device 608.

Fourth host GPIO 628 couples the host device 602 through a third configuration of connectors 620 to corresponding pins in the fourth slave GPIO 636 in the fourth slave device 610. The fourth host GPIO 628 may include GPIO pins configured as an input, an output or a bidirectional pin, with corresponding fourth slave GPIO 636 being configured to match the type of signaling transmitted over connectors in the fourth configuration of connectors 620. Some GPIO pins may be configured to be placed in a high-impedance state.

Additional slave GPIO 642, 644, 646 may be provided in certain slave devices 604, 606, 608 to support signaling between the slave devices 604, 606, 608 over connectors 638, 640 that are not coupled to the host device 602. Signaling between slave devices 606, 608, 610 may also occur on the connectors 616 and 618 coupled to the host device 602. Some connectors 616, 618, 638 support multi-drop or multipoint signaling where signals generated at a first device are received by multiple devices. In some instances, the connectors 616, 618, 638 may support multi-drive signaling where signals can be generated at one or more devices.

Certain aspects disclosed herein enable GPIO state generated on different devices to be communicated across a multi-drop bus, such that physical interconnections between different groups or pairs of devices can be eliminated.

Figure 7:
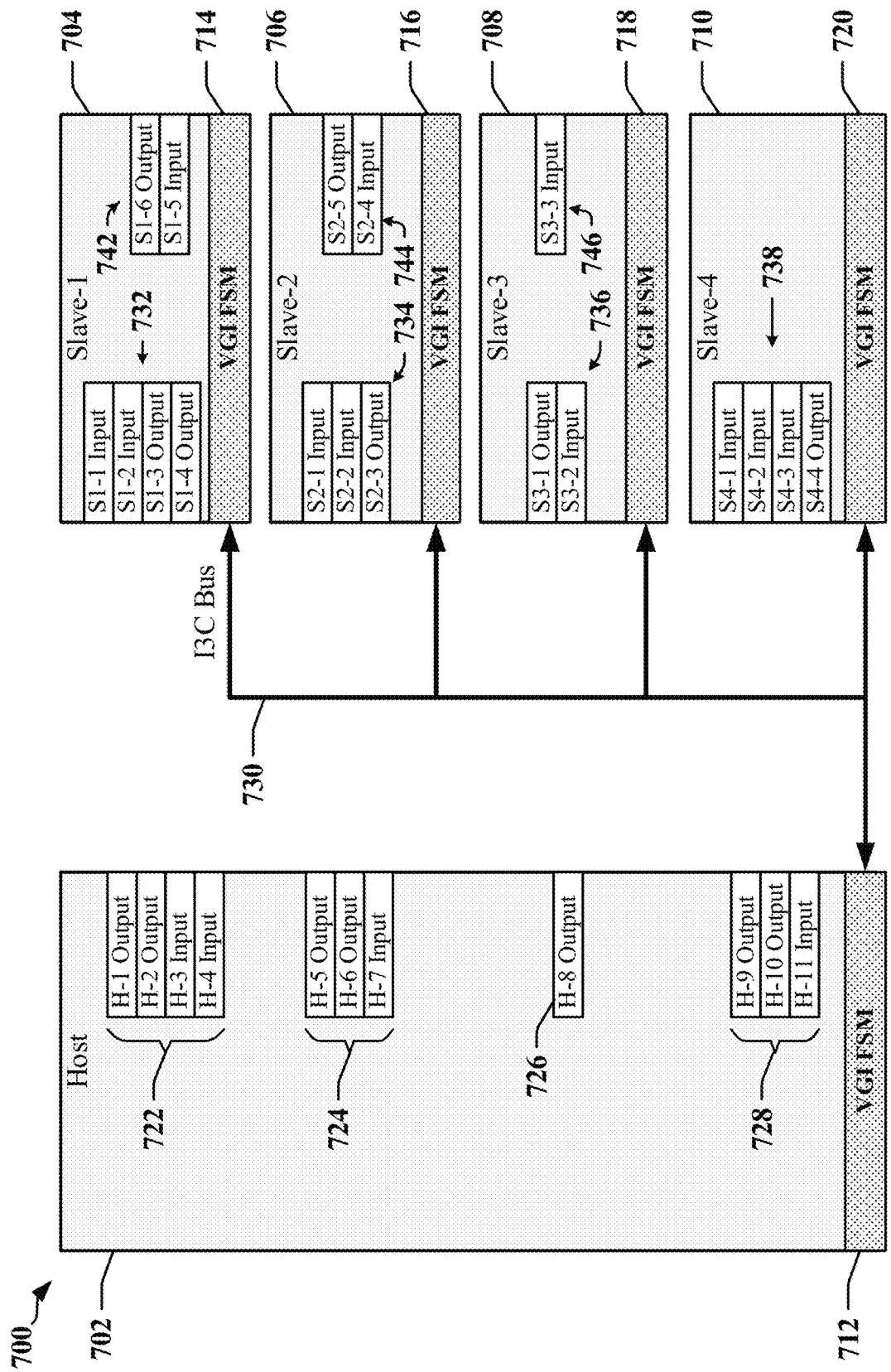
FIG. 7 illustrates an example of a system that can virtualize physical GPIO state on multiple devices and that can communicate virtual GPIO state over a multi-drop bus in accordance with certain aspects disclosed herein.

FIG. 7 illustrates an example of a system 700 that can virtualize physical GPIO state 722, 724, 726, 728, 732, 734, 736, 738, 742, 744, 746 on multiple devices 702, 704, 706, 708, 710 and that can communicate virtual GPIO state over a multi-drop bus 730. The system 700 may provide functionality equivalent to the functionality of the system 600 illustrated in FIG. 6 in that the changes in state of an output GPIO pin in one device 702, 704, 706, 708, 710 is communicated to one or more devices to modify state of corresponding input GPIO pins. In one example the multi-drop bus 730 is implemented as an I3C serial bus. A mapping of interconnections between GPIO pins may be maintained in each device 702, 704, 706, 708, 710 to enable packets that include virtual GPIO messages to be transmitted over the multi-drop bus 730 with proper destination address values. In some instances, GPIO state virtualization and communication may be managed by a finite state machine (VGI FSM 712, 714, 716, 718, 720) in each device 702, 704, 706, 708, 710. Each VGI FSM 712, 714, 716, 718, 720 may include or be coupled to a bus interface circuit that operates in accordance with I3C specifications, for example.

Certain aspects disclosed herein relate to consolidation of virtual GPIO state and/or virtual GPIO messages when multiple source and destination combinations are defined. FIG. 6 illustrates a system where the combinations of source and destination for virtual GPIO messages includes host-to-slave, slave-to-host and slave-to-slave connections. In many implementations, the use of a multi-drop bus 730 for communicating virtual GPIO messages may be limited by bus latency. Bus latency may arise from delays in message transmission that are inherent in the nature of serial multi-drop buses. For example, bus latency may include the time elapsed between the time at which the physical GPIO state becomes available for transmission at the source of the GPIO state and the reception and decoding of the virtual GPIO message at a destination for the GPIO state. Bus latency may include the time required to complete or terminate an ongoing transmission after a virtual GPIO message becomes available for transmission. Bus latency may include arbitration time when multiple sources of virtual GPIO messages are supported, and/or the time required to complete or terminate an ongoing transmission after a virtual GPIO message becomes available for transmission.

Virtual GPIO consolidation over the multi-drop bus 730 can introduce additional transmission latencies, including latencies resulting from the existence of different source-destination combinations. For example, transmission of a virtual GPIO message representing GPIO state generated in the host device 702 may compete for transmission with a virtual GPIO message directed to the host device 702 that includes GPIO state generated by a slave device 704, 706, 708, 710, and/or a virtual GPIO message directed to a slave device 704, 706, 708, 710 that includes GPIO state generated by another slave device 704, 706, 708, 710. Conventional approaches to reducing latency include increasing transmission rates. However, this approach may not be applicable in all cases due to capabilities of the multi-drop bus 730 and/or devices 702, 704, 706, 708, 710 coupled to the multi-drop bus 730.

Optimized Virtual GPIO Messaging

Systems adapted according to certain aspects disclosed herein can achieve optimal bus latency through efficient system level operation enabled by in-band configuration of bus operating-mode and device-skip during virtual GPIO message transmission. According to certain aspects of this disclosure, a single transaction executed over a shared multi-drop bus can be used to communicate virtual GPIO state from multiple sources to multiple destinations. In one example, the sources of virtual GPIO state may be configured to transmit one or more bits of virtual GPIO state in a defined order. Referring again to the system 700 of FIG. 7, the transmission order may be defined as: {Host, Slave-1, Slave-2, Slave-3, Slave-4}. Various modes may be defined for the transaction that enables transmission of virtual GPIO state from multiple sources. In some modes, one or more devices may be excluded from the defined sequence, allowing other devices to move up the transmission order.

Figure 8:
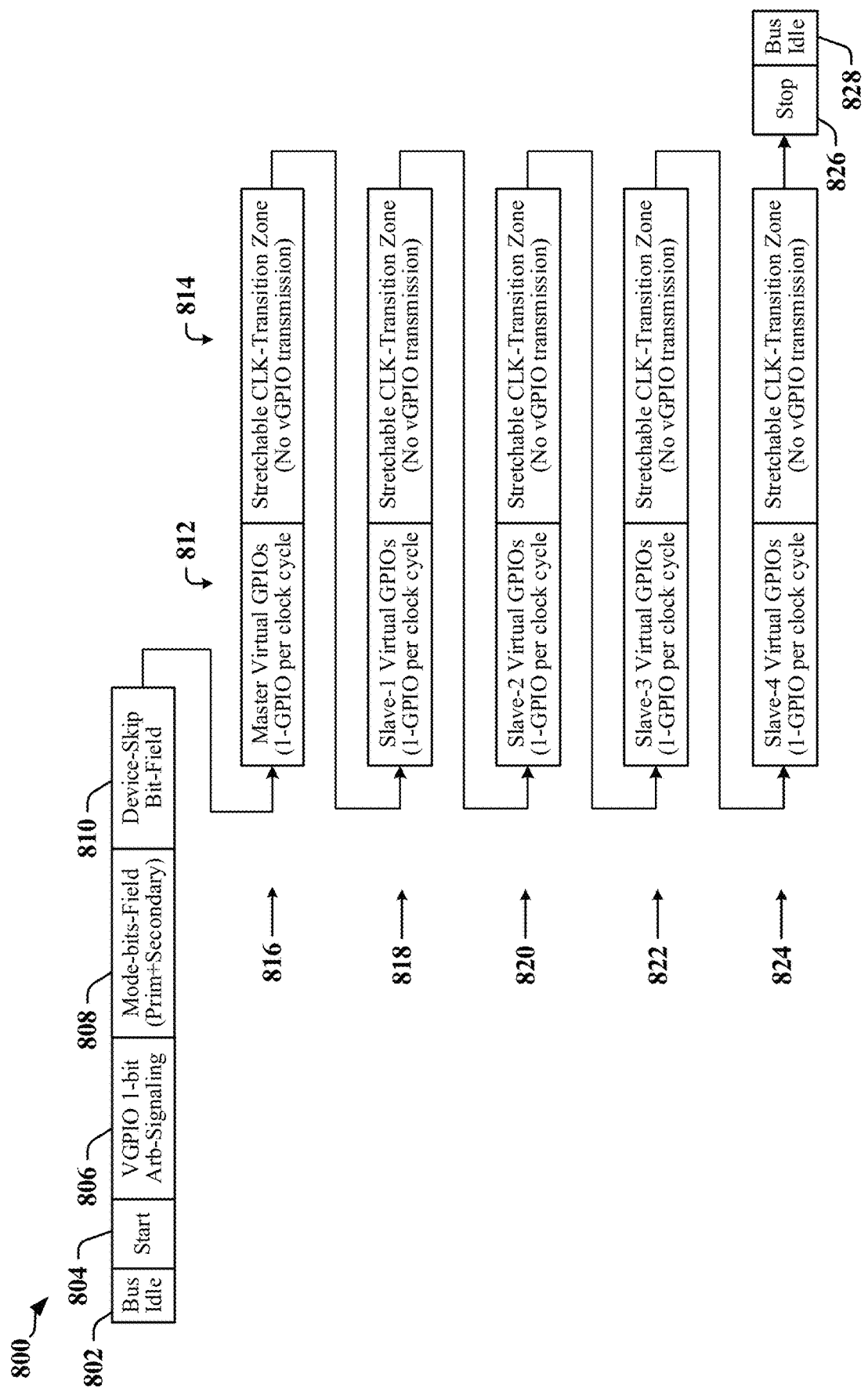
FIG. 8 illustrates an example of a frame structure that may be used to enable communication of virtual GPIO state from multiple sources to multiple destinations in accordance with certain aspects disclosed herein.

FIG. 8 illustrates an example of a frame structure 800 that may be used to enable communication of virtual GPIO state from multiple sources to multiple destinations. The frame structure 800 is based on the system 700 of FIG. 7, where a host device 702 exchanges virtual GPIO state with four slave devices 704, 706, 708, 710. The configuration of the frame structure 800 may be provided to each device 702, 704, 706, 708, 710 that is a source or destination of virtual GPIO state. A transmission order defines when each device 702, 704, 706, 708, 710 can transmit virtual GPIO state, and the transmission order of bits of virtual GPIO state is also defined. The transmission order of devices 702, 704, 706, 708, 710 and bits of virtual GPIO state is used by transmitters and receivers. Transmitters are adapted to provide bits of virtual GPIO state corresponding to output GPIO pins at defined positions in the transaction and receivers that include corresponding input GPIO pins read the virtual GPIO state at the designated bit interval in the transaction.

In certain aspects, the frame structure 800 may be transmitted in various operating modes defined for virtual GPIO exchange. In one example, some operating modes permit one or more devices 702, 704, 706, 708, 710 to refrain from transmitting virtual GPIO state. In another example, the number and format of virtual GPIO bits representing state of a single GPIO pin may vary between operating modes. Examples of operating modes include: (i) non-masked write mode; (ii) masked write mode; (iii) mixed non-masked and masked write mode; (iv) altered transmission timing mode.

The frame structure 800 provides a start code 804 that initiates transmission of the virtual GPIO transaction and a stop code 826 that terminates transmission of the virtual GPIO transaction. The multi-drop bus 730 is in an idle state 802 before transmission of the start code 804 and returns to the idle state 828 after transmission of the stop code 826. An arbitration field 806 may be transmitted to indicate that the transaction relates to virtual GPIO.

A mode field 808 is transmitted to select a mode for virtual GPIO exchange. The mode field 808 may include a primary-mode indicator bit and an N-bit secondary-mode selection field. When the primary-mode indicator has a first value, a basic or commonly-used mode may be selected where secondary mode bits are not used or transmitted. When the primary-mode indicator has a second value, the secondary mode bits are transmitted to select a particular mode governing configuration of the frame to be transmitted. In one example, the primary-mode indicator is transmitted as a one-bit binary value.

A device-skip field 810 is provided in some modes to enable each source device 702, 704, 706, 708, 710 to indicate whether it intends to transmit virtual GPIO bits. The device-skip field 810 may provide one or more bits per source device 702, 704, 706, 708, 710. In some implementations, certain devices may be required to transmit virtual GPIO state when any virtual GPIO state is being transmitted. The device-skip field 810 may provide bits for fewer than all of the source devices 702, 704, 706, 708, 710. When a source device 702, 704, 706, 708, 710 indicates that no virtual GPIO bits will be transmitted, sources and receivers of virtual GPIO state adjust order of transmission, and timing information used to transmit and/or receive virtual GPIO bits. In one example, the device-skip field 810 is not transmitted unless the secondary mode bits are transmitted.

The order of transmission of configuration fields, including the mode field 808 and the device-skip field 810 may be defined as desired or required by application, during system initialization, during manufacture and/or by design.

Following the transmission of the mode field 808, device-skip field 810, and/or other configuration fields, one or more bit-slots may be provided for each device 702, 704, 706, 708, 710 to transmit virtual GPIO state. The bit-slots may be provided in accordance with information transmitted in the device-skip field 810 when a device-skip operation mode is enabled. In one example, the order of transmission causes virtual GPIO state 816 generated by the master device 702 to be transmitted first followed by virtual GPIO state 818 generated by the first slave device 704, virtual GPIO state 820 generated by the second slave device 706, virtual GPIO state 822 generated by the third slave device 708, and virtual GPIO state 824 generated by the fourth slave device 710. The order of transmission of virtual GPIO state 816, 818, 820, 822, 824 may be selected by application, during device initialization, during manufacture and/or by design.

Each transmission of virtual GPIO state 816, 818, 820, 822, 824 may include a bit-field 812 that carries virtual GPIO state followed by a period of time 814 during which the clock signal (SCL) may be stretched to provide sufficient time for data line (SDA) turnaround. SDA turnaround occurs in a device 702, 704, 706, 708, 710 that has just completed transmission and is transitioning to a listening mode, or in a device 702, 704, 706, 708, 710 that has just is transitioning from the listening mode to transmission mode. Stretch time may be configured based on implementation particulars. In some implementations, additional time for SDA turnaround is not needed and/or not used.

Each device 702, 704, 706, 708, 710 may be configured with a virtual GPIO mapping table. In one example, a device 702, 704, 706, 708, 710 may map its internal input physical GPIO pins to devices that are a source of virtual GPIO state that affects the input physical GPIO pins. Virtual GPIO state received from such sources may be used to define the state of the internal input physical GPIO pins. The mapping table may define the order of transmission of the device that is a source of virtual GPIO state in the frame structure 800. The mapping table may further define the configuration of virtual GPIO bits in the frame structure 800 as transmitted by the source of virtual GPIO state. The mapping table may include one-to-one, one-to-many, and/or many-to-one virtual GPIO mappings.

In another example, a device 702, 704, 706, 708, 710 may map its internal output physical GPIO pins to a virtual GPIO bit-field for transmission in the frame structure 800. Each device may also include its transmission order in the virtual GPIO mapping table. In some examples, transmission order may be maintained independently of the virtual GPIO mapping table. Information in the virtual mapping table may copied and modified for certain virtual GPIO state transmission modes including, for example, in modes in which a mask is use and when one or more devices has elected to skip transmission of virtual GPIO state. In one example, device-skip may be implemented in a configurable hardware block.

Figure 9:
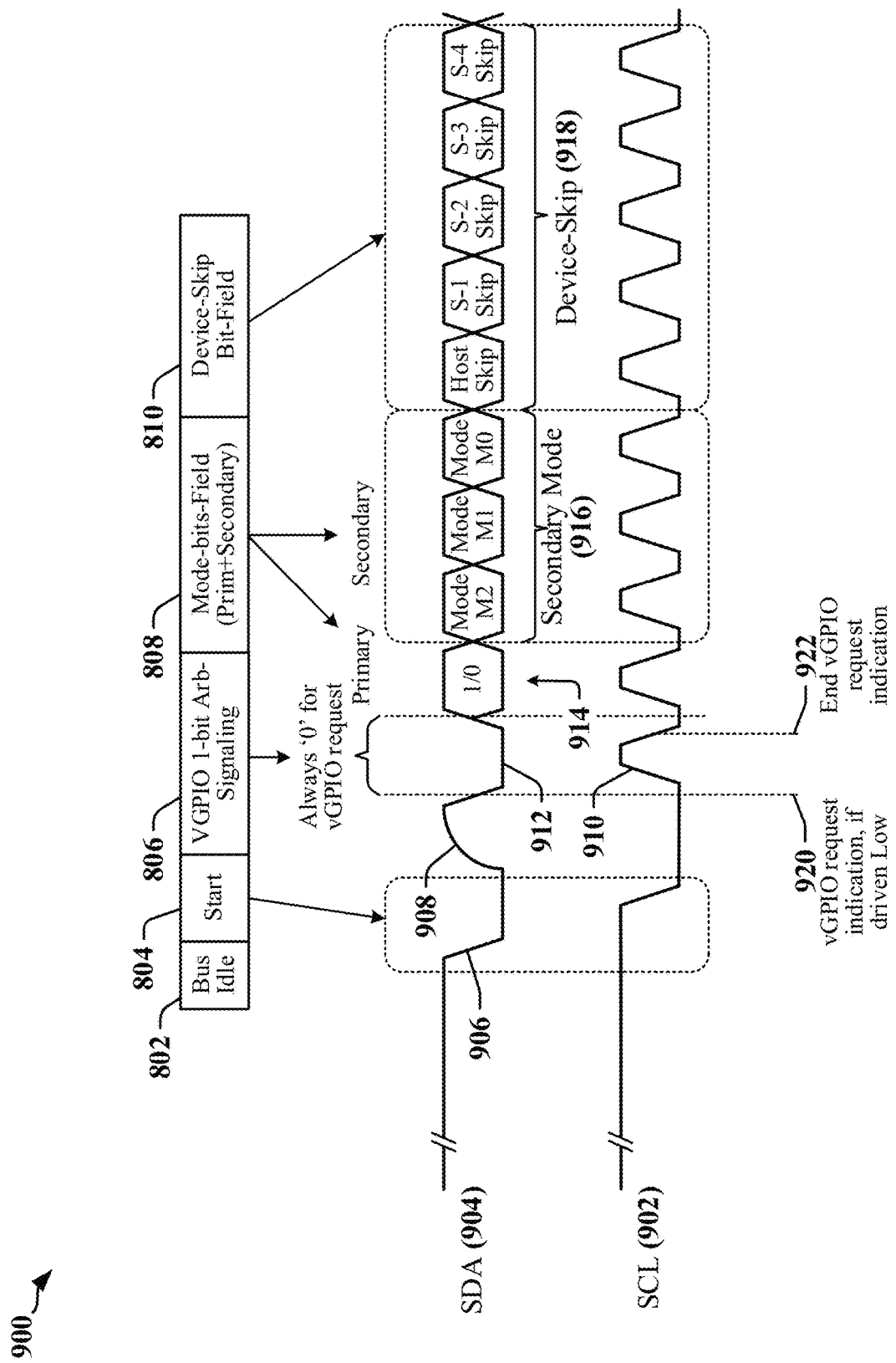
FIG. 9 illustrates certain timing aspects associated with the initiation and configuration fields of the frame structure illustrated in FIG. 8 and provided in accordance with certain aspects disclosed herein.

FIG. 9 illustrates certain timing aspects associated with the initiation and configuration fields 900 of the frame structure 800 illustrated in FIG. 8. The illustrated start code 804 is consistent with I3C protocols, whereby a high-to-low transition 906 is driven on the SDA line 904 while the SCL line 902 is in a high state. The SCL line 902 is then driven low before clock pulses are transmitted on the SCL line 902. When the SCL line 902 transitions low, the SDA line 904 is released to an open-drain or high-impedance state. A pull-up resistor causes the SDA line 904 to rise slowly in a transition 908 to the high state. A first clock pulse 910 marks the arbitration field 806 (commencing at Start vGPIO request 920, ending at End vGPIO request 922), which may be a one-bit field. One or more of the devices 702, 704, 706, 708, 710 may drive the SDA line 904 to a low state 912 indicating that virtual GPIO state is to be transmitted. If no device 702, 704, 706, 708, 710 has virtual GPIO state for transmission, the SDA line 904 remains high, pulled up by the pull-up resistor, and a transaction may commence that involves exchange of application data, configuration and/or command and control transmissions.

When the arbitration field 806 indicates that a device 702, 704, 706, 708, 710 wishes to transmit virtual GPIO state, the bus master may transmit mode information. In one example, a primary mode bit 914 is transmitted that indicates whether secondary mode bits 916 and/or device-skip bits 918 are to be transmitted. In one example, when the primary mode bit 914 is set high, transmission of the secondary mode bits 916 and the device-skip bits 918 is suppressed, and transmission of virtual GPIO bits of all sources commences in the configured order. When the primary mode bit 914 is set low, then the secondary mode bits 916 are transmitted to identify a mode of transmission for the virtual GPIO state. Table 1 illustrates an example of encoding of secondary mode bits 916.

TABLE 1

| M2 | M1 | M0 | Function |
|---|---|---|---|
| 0 | 0 | 0 | Transmission by host only |
| 0 | 0 | 1 | Transmission by host and Slaves without device-skipping enabled |
| 0 | 1 | 0 | Transmission by host and Slaves with device-skipping enabled |
| 0 | 1 | 1 | Host and Slave masked vGPIO transmission (device-skipping enabled) |

TABLE 1-continued

| M2 | M1 | M0 | Function |
|---|---|---|---|
| 1 | 0 | 0 | Host and Slave mixed mode transmission (device-skipping enabled) |
| 1 | 0 | 1 | Reserved |
| 1 | 1 | 0 | Reserved |
| 1 | 1 | 1 | Reserved |

In certain implementations and/or modes, the device-skip bits 918 are driven by corresponding source devices 702, 704, 706, 708, 710 when device-skip is enabled by the mode selected by the bits of the mode field 808. The source devices 702, 704, 706, 708, 710 may drive one or more of the device-skip bits 918 on the SDA line 904 in the same order that is assigned for transmitting virtual GPIO state. In the example illustrated in FIGS. 7 and 8, the first bit of the device-skip bits 918 may be provided to enable the master device 702 to indicate whether it intends to transmit virtual GPIO state, the second bit of the device-skip bits 918 may be provided to enable the first slave device 704 to indicate whether it intends to transmit virtual GPIO state, the third bit of the device-skip bits 918 may be provided to enable the second slave device 706 to indicate whether it intends to transmit virtual GPIO state, the fourth bit of the device-skip bits 918 may be provided to enable the third slave device 708 to indicate whether it intends to transmit virtual GPIO state, and the fifth bit of the device-skip bits 918 may be provided to enable the fourth slave device 710 to indicate whether it intends to transmit virtual GPIO state. The order of transmission of device-skip bits 918 may be selected by application, during device initialization and/or by design. During transmission of the device-skip bits 918, a device 702, 704, 706, 708, 710 may actively drive the SDA line 904 low or leave the SDA line 904 to be held in the high state by a pull-up resistor. In one example, skip may be indicated by a high state on the SDA line 904, while no-skip may be indicated by a low state on the SDA line 904. In another example, skip may be indicated by a low state on the SDA line 904, while no-skip may be indicated by a high state on the SDA line 904.

Figure 10:
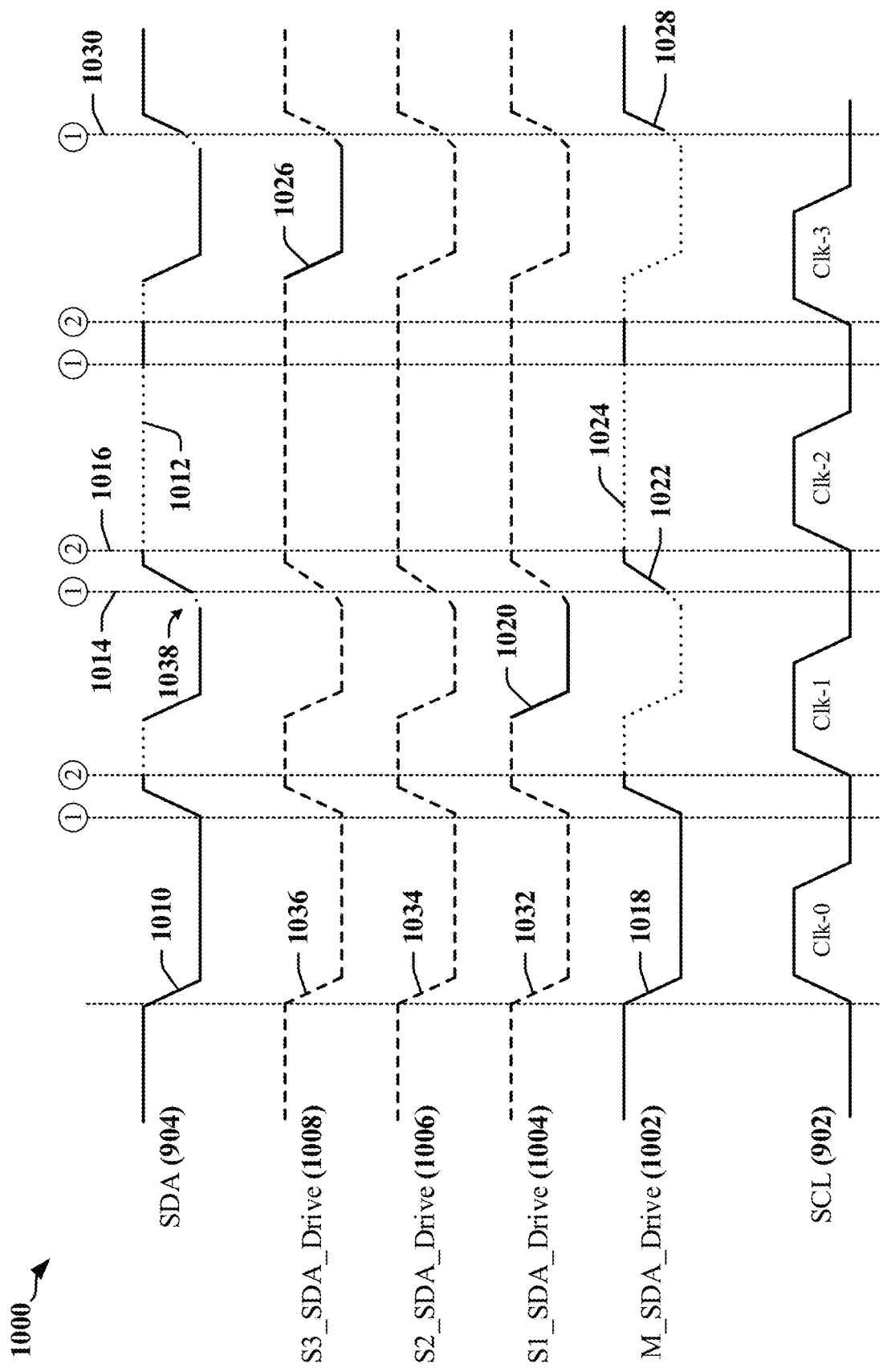
FIG. 10 illustrates signaling associated with transmission of device-skip bits the frame structure illustrated in FIG. 8 and provided in accordance with certain aspects disclosed herein.

FIG. 10 illustrates signaling 1000 associated with transmission of the device-skip bits 918. The state of the SDA line 904 is the result of combined contributions of the SDA driver output 1002 in a bus master device (e.g., the host device 702) and the SDA driver outputs 1004, 1006, 1008 of three slave devices (e.g., three of the slave devices 704, 706, 708, 710). For example, the transition 1018 driven by the bus master appears on the SDA line 904 as the transition 1010, and each of the slave devices is in a high-impedance state 1032, 1034, 1036. The bus master may enter an open-drain or similar operating state when the bus master is not transmitting. The slave devices enter a high-impedance state when not transmitting. When no device is transmitting, the SDA line 904 is in the an open-drain state 1012 corresponding to the an open-drain state 1024 of the bus master. A pull-up resistor holds the SDA line 904 in the high state when no device is driving. The SDA line 904 may rise slowly 1038 after being driven low before a driving device enters high-impedance state.

In FIG. 10, two of the three slaves drive the SDA line 904 during transmission of the device-skip bits 918. A first slave device drives a transition 1020 on the SDA line 904 and holds the SDA line 904 low until a first point in time 1038 occurring just before the time 1014 that the bus master drives a positive-going transition 1022 on the SDA line 904. The master device continues driving the line until a second point in time 1016 when it enters the open-drain state 1024. A second slave device then refrains from driving the SDA line 904 low. In the next clock cycle a third slave device drives a transition 1026 on the SDA line 904 and holds the SDA line 904 low until a third point in time 1030 occurring just before the bus master drives a positive-going transition 1028 on the SDA line 904. The third slave device is the last configured slave device and the master device may continue actively driving the line in continuing the transaction.

In certain implementations, a mode may be defined where the bus master (e.g., the host device 702) drives the SDA line 904 during the entirety of the device-skip bits 918 transmission. In this mode, the bus master may select which slave devices 704, 706, 708, 710 are to transmit virtual GPIO state, and which slave devices 704, 706, 708, 710 are to be skipped.

Figure 11:
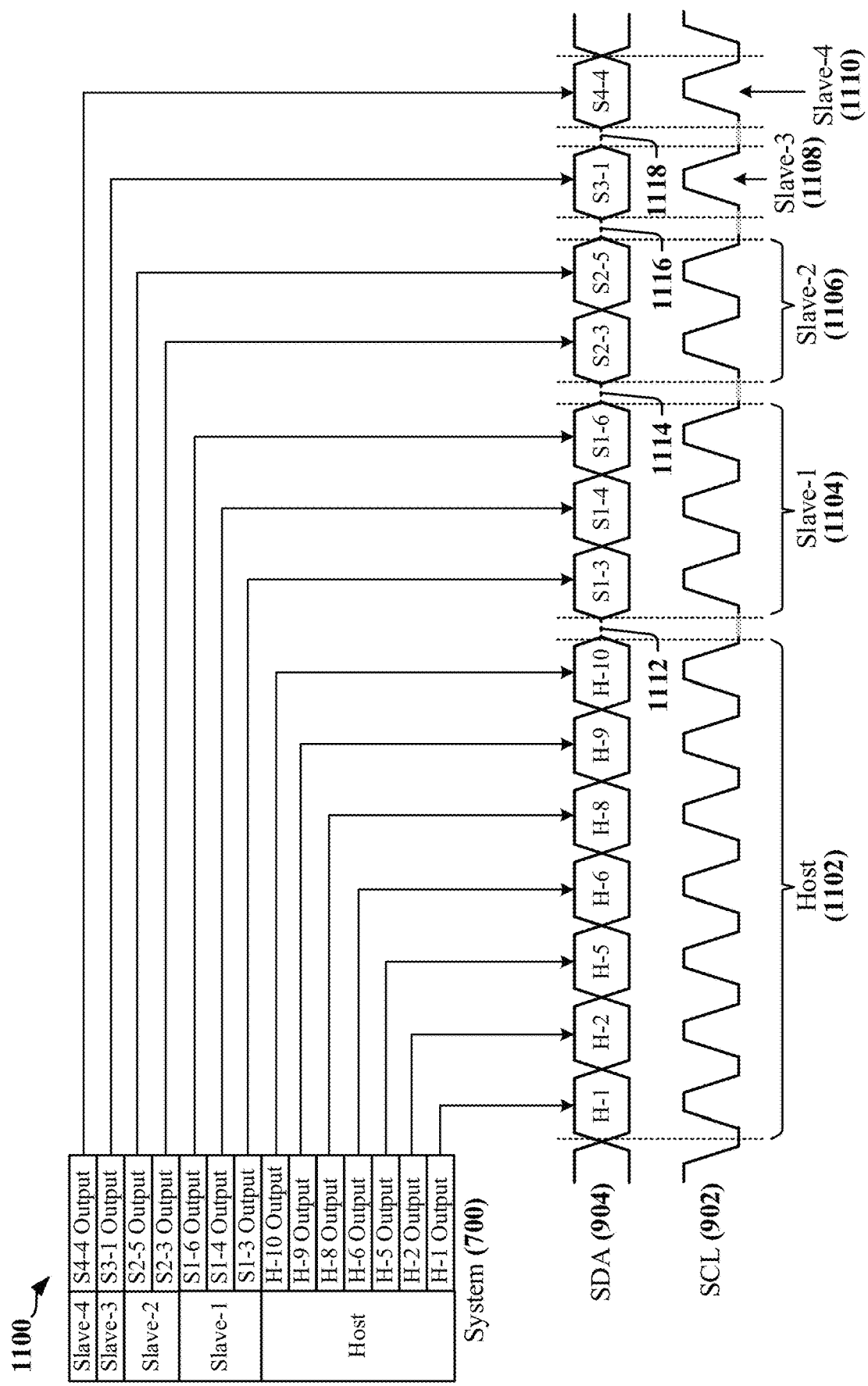
FIG. 11 illustrates the order of transmission of virtual GPIO bits when no masking or device-skipping is configured in accordance with certain aspects disclosed herein.

FIG. 11 illustrates the order of transmission 1100 of virtual GPIO bits when no masking or device-skipping is configured. As illustrated in FIG. 7, the host device 702 is configured for seven output GPIO pins, the first slave device 704 is configured for three output GPIO pins, the second slave device 706 is configured for two output GPIO pins, while the third slave device 708 and fourth slave device 708 are each configured for one output GPIO pin. Appropriately-sized transmission slots 1102, 1104, 1106, 1108, 1110 are configured and ordered as defined by configuration information disseminated to, and maintained by, devices 702, 704, 706, 708, 710 of the system 700.

In the first transmission slot 1102, the host device 702 transmits GPIO state bits in the configured order. The host device 702 then causes the SDA line 904 to enter a high-impedance or open-drain state 1112 to facilitate bus turnaround before a second transmission slot 1104 commences. In the second transmission slot 1104, the first slave device 704 transmits GPIO state bits in the configured order. The first slave device 704 then causes the SDA line 904 to enter a high-impedance state 1114 to facilitate bus turnaround before a third transmission slot 1106 commences. In the third transmission slot 1106, the second slave device 706 transmits GPIO state bits in the configured order. The second slave device 706 then causes the SDA line 904 to enter a high-impedance state 1116 to facilitate bus turnaround before a fourth transmission slot 1108 commences. In the fourth transmission slot 1108, the third slave device 708 transmits GPIO state bits in the configured order. The third slave device 708 then causes the SDA line 904 to enter a high-impedance state 1118 to facilitate bus turnaround before a fifth transmission slot 1110 commences. In the fifth transmission slot 1110, the fourth slave device 710 transmits GPIO state bits in the configured order.

Each bus turnaround may be facilitated by stretching the clock signal transmitted on the SCL line 902.

Figure 12:
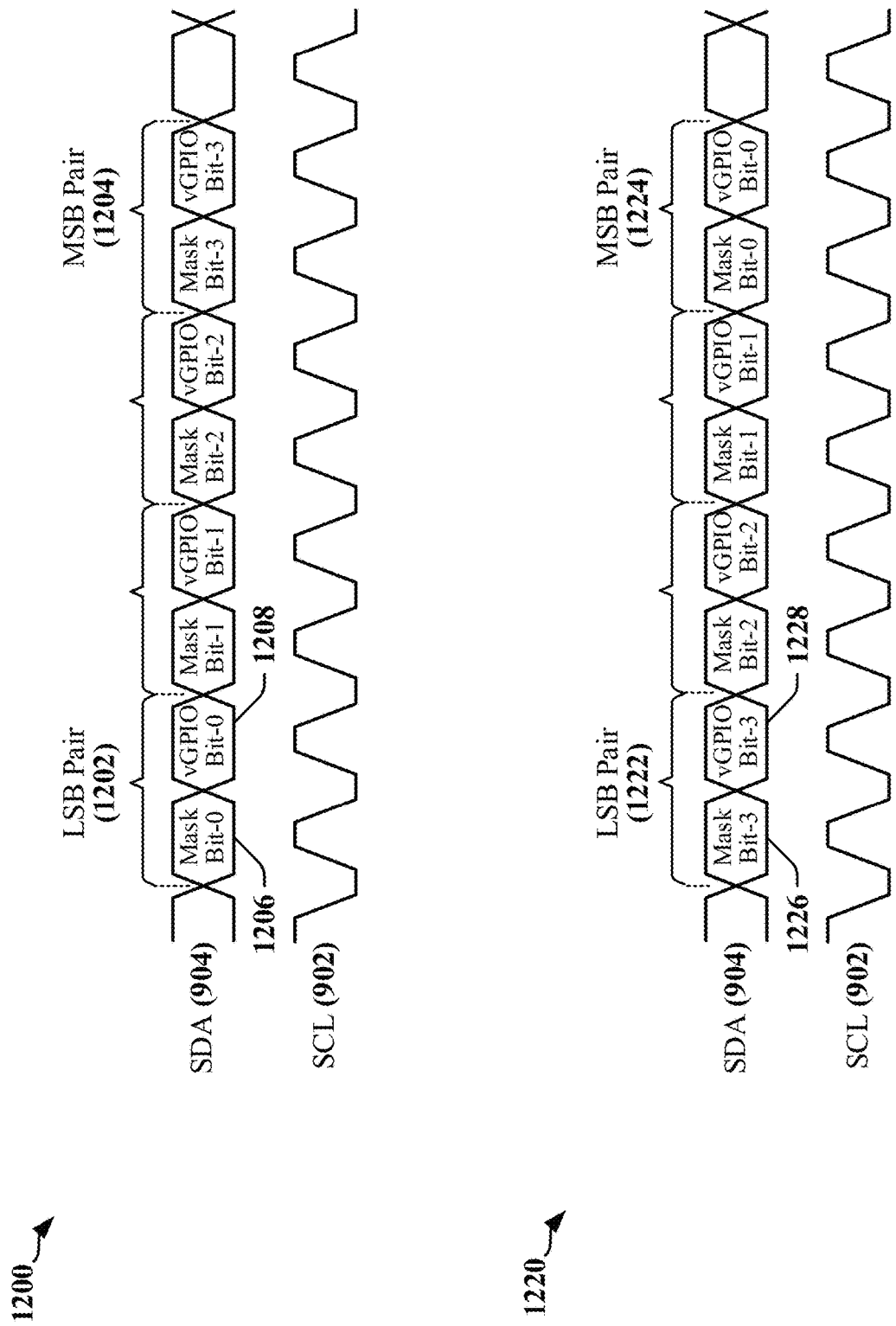
FIG. 12 illustrates examples of masked virtual GPIO transmissions in accordance with certain aspects disclosed herein.

FIG. 12 illustrates examples 1200, 1220 of masked virtual GPIO transmissions. In the first example 1200, each virtual GPIO bit 1208 is transmitted in a pair of bits 1202, 1204 with a mask bit 1206. The mask bit 1206 enables a receiver to determine whether to ignore or apply the corresponding virtual GPIO bit 1208. In the first example 1200, the bit order is from least significant bit (LSB) to most significant bit (MSB). In the second example 1220, each virtual GPIO bit 1228 is transmitted in a pair of bits 1222, 1224 with a mask bit 1226. The mask bit 1226 enables a receiver to determine whether to ignore or apply the corresponding virtual GPIO bit 1228. In this second example 1220, the bit order is from MSB to LSB.

Figure 13:
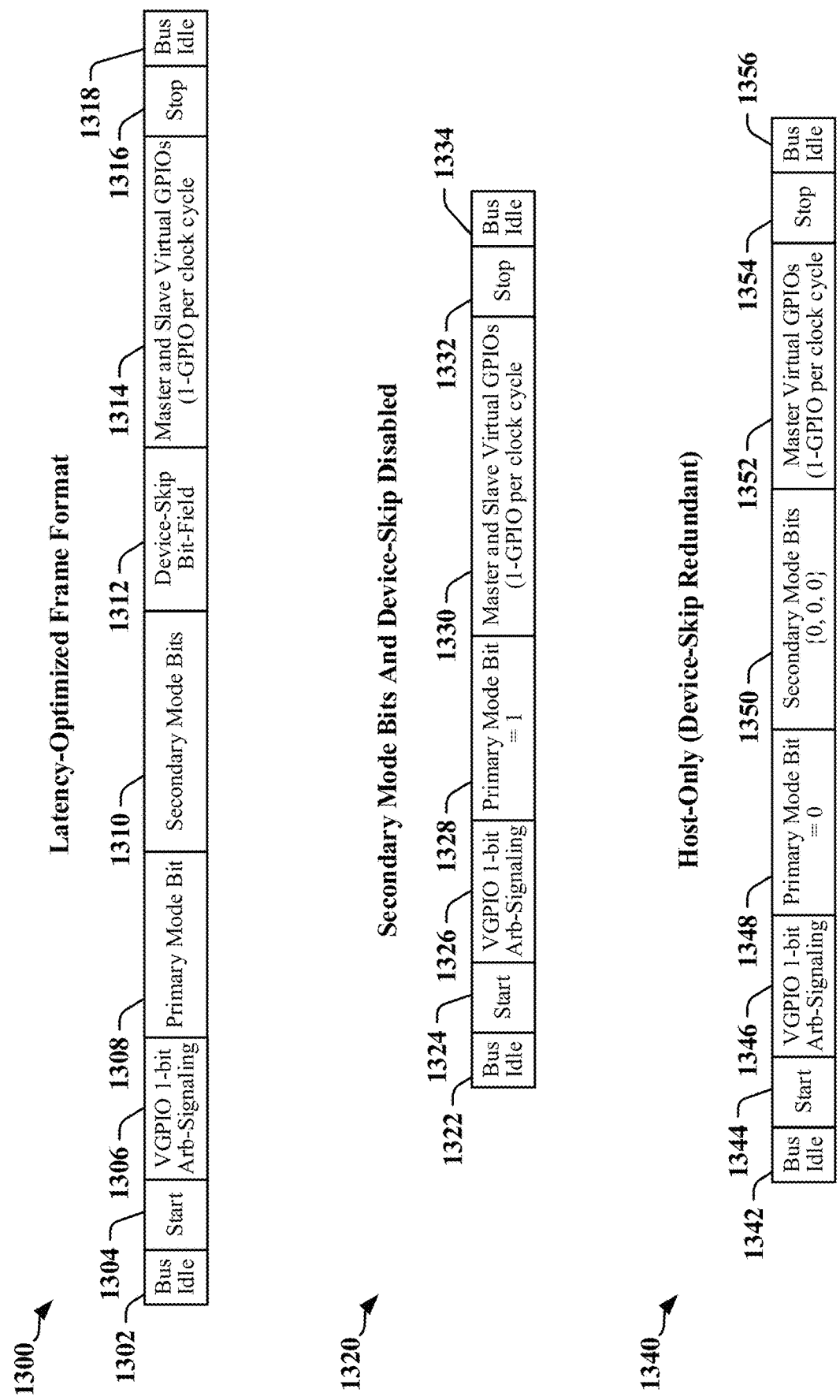
FIG. 13 illustrates certain examples of transmission modes that may be implemented in accordance with certain aspects disclosed herein.

FIG. 13 illustrates certain examples 1300, 1320, 1340 of transmission modes that may be implemented in accordance with certain aspects disclosed herein. The first example 1300 is a generic example. In the first example 1300, a start code 1304 initiates transmission of the virtual GPIO transaction and a stop code 1316 terminates transmission of the virtual GPIO transaction. The multi-drop bus 730 is in an idle state 1302 before transmission of the start code 1304 and returns to the idle state 1318 after transmission of the stop code 1316. An arbitration field 1306 may be transmitted to indicate that the transaction relates to virtual GPIO. The primary mode 1-bit field 1308 follows and indicates whether the bits of a secondary mode field 1310 and/or a device-skip field 1312 are to be transmitted. After the indicated combination of configuration fields 1308, 1310, 1312 has been transmitted, the master and/or slave GPIO state information 1314 is transmitted.

The second example 1320 illustrates a mode that suppresses the secondary mode and device-skip bit fields. In the second example 1320, a start code 1324 initiates transmission of the virtual GPIO transaction and a stop code 1332 terminates transmission of the virtual GPIO transaction. The multi-drop bus 730 is in an idle state 1322 before transmission of the start code 1324 and returns to the idle state 1334 after transmission of the stop code 1332. An arbitration field 1326 may be transmitted to indicate that the transaction relates to virtual GPIO. The 1-bit primary mode field 1328 follows and is set to binary '1' to indicate that secondary mode bits and a device-skip field are not to be transmitted. Accordingly, all source devices 702, 704, 706, 708, 710 are to transmit virtual GPIO state. After the primary mode field 1328 has been transmitted, the master and slave virtual GPIO state information 1330 is transmitted.

The third example 1340 illustrates a mode that cause only GPIO state information sourced at the host device 702 to be transmitted. The device-skip bit field is redundant and suppressed. In the third example 1340, a start code 1344 initiates transmission of the virtual GPIO transaction and a stop code 1354 terminates transmission of the virtual GPIO transaction. The multi-drop bus 730 is in an idle state 1342 before transmission of the start code 1344 and returns to the idle state 1356 after transmission of the stop code 1354. An arbitration field 1346 may be transmitted to indicate that the transaction relates to virtual GPIO. The 1-bit primary mode field 1348 follows and is set to binary '0' to indicate that secondary mode bits 1350 define the mode. The secondary mode bits 1350 cause the suppression of the device-skip field and indicate that only the host device 702 is to transmit virtual GPIO state. After the primary mode field 1348 has been transmitted, the master virtual GPIO state information 1352 is transmitted.

Figure 14:
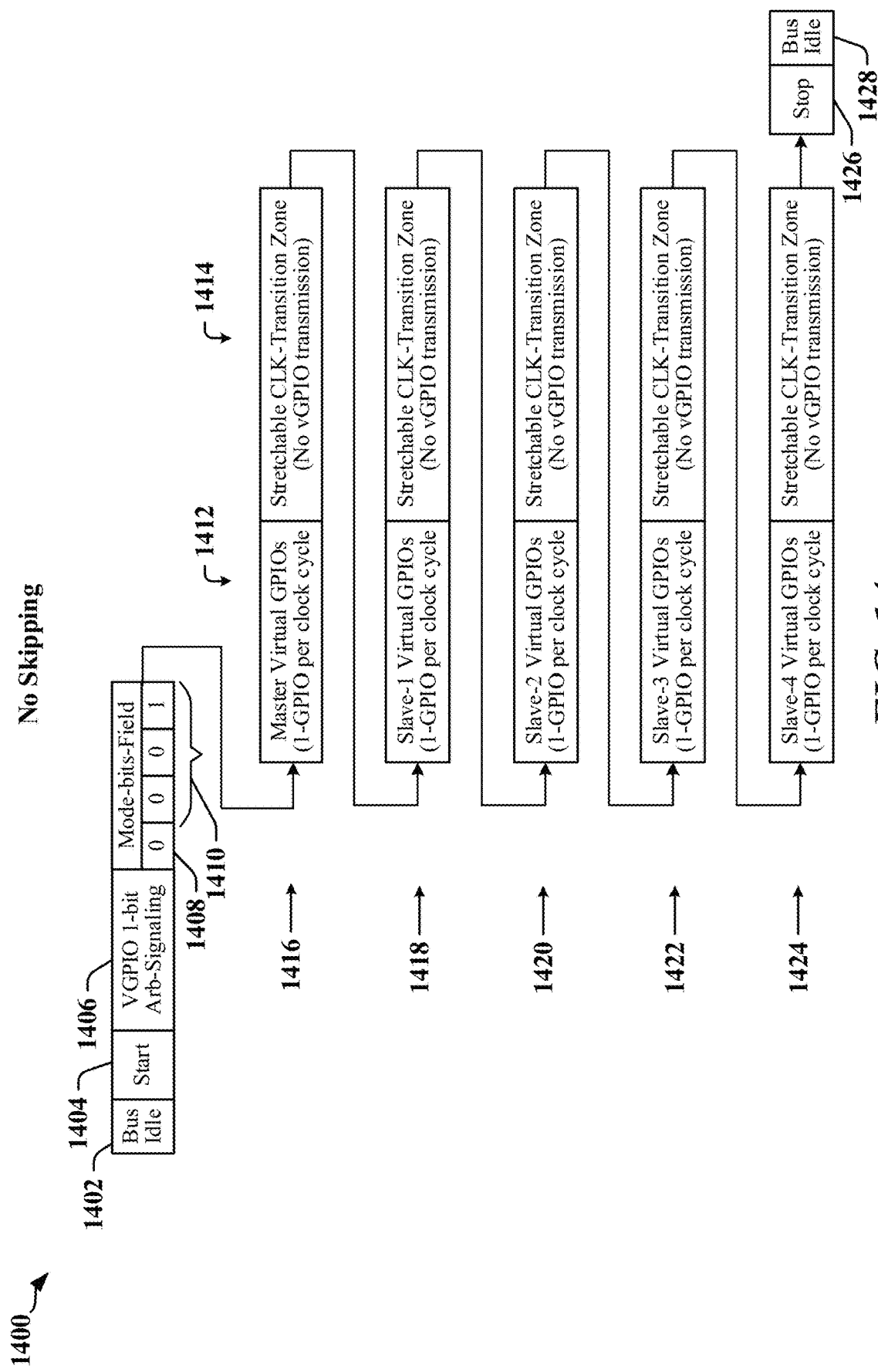
FIG. 14 illustrates an example in which skipping is prevented in accordance with certain aspects disclosed herein.

FIG. 14 illustrates an example 1400 in which skipping is prevented. A start code 1404 initiates transmission of the virtual GPIO transaction and a stop code 1426 terminates transmission of the virtual GPIO transaction. The multi-drop bus 730 is in an idle state 1402 before transmission of the start code 1404 and returns to the idle state 1428 after transmission of the stop code 1426. An arbitration field 1406 may be transmitted to indicate that the transaction relates to virtual GPIO. The primary mode 1-bit field 1408 follows indicates that secondary mode bits 1410 are to be transmitted. The secondary mode bits 1410 indicate that no device-skip field is to be transmitted. After the secondary mode bits 1410 have been transmitted, the master and/or slave GPIO state information transmissions 1416, 1418, 1420, 1422, 1424 are transmitted. The GPIO state information transmissions 1416, 1418, 1420, 1422, 1424 may include a GPIO state information field 1412 and may be followed by a period of time 1414 during which the clock is stretched.

Figure 15:
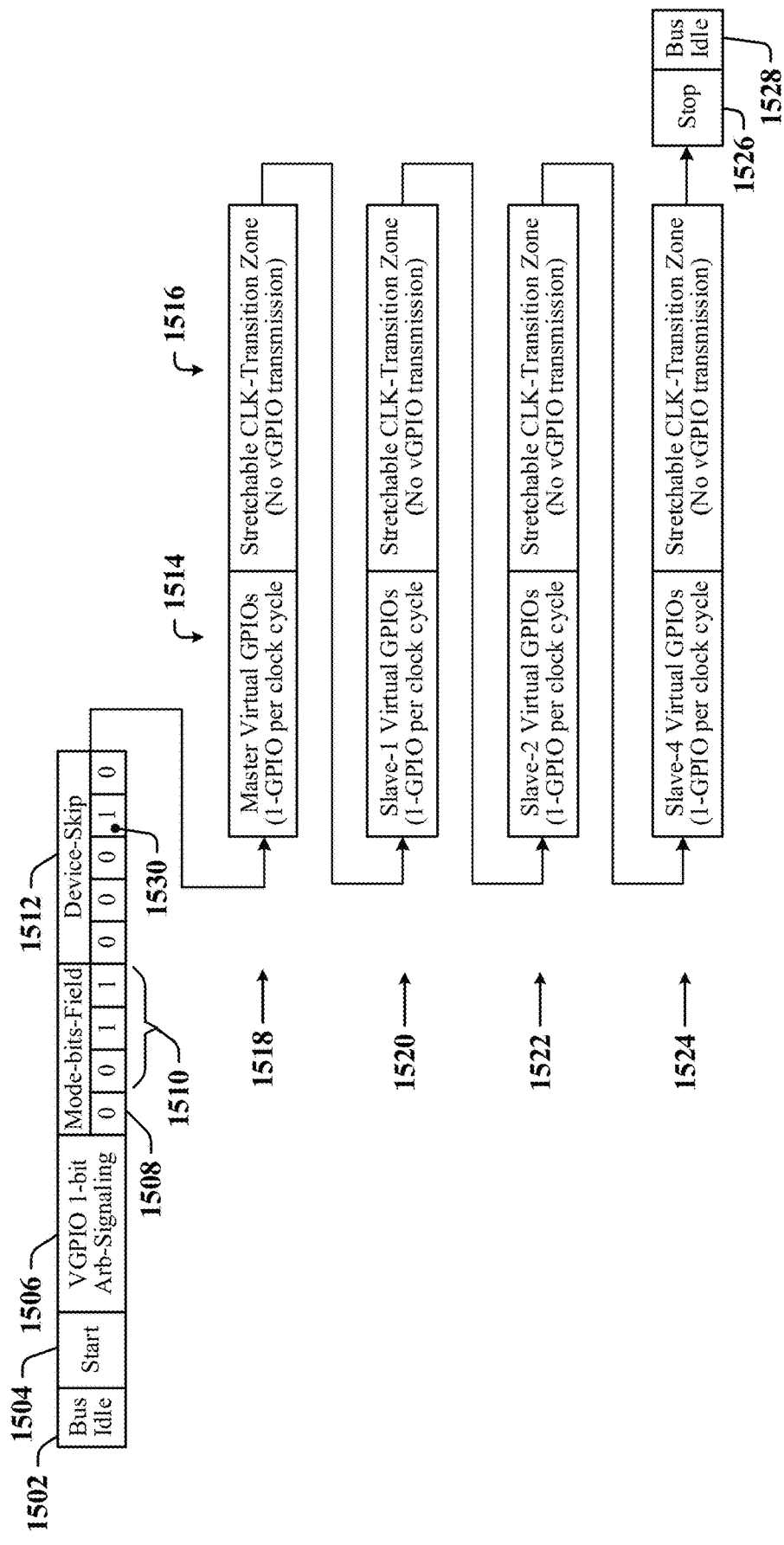
FIG. 15 illustrates an example in which skipping is performed in accordance with certain aspects disclosed herein.

FIG. 15 illustrates an example 1500 in which skipping is performed. Here, the third slave device 708 elects to skip transmission. A start code 1504 initiates transmission of the virtual GPIO transaction and a stop code 1526 terminates transmission of the virtual GPIO transaction. The multi-drop bus 730 is in an idle state 1502 before transmission of the start code 1504 and returns to the idle state 1528 after transmission of the stop code 1526. An arbitration field 1506 may be transmitted to indicate that the transaction relates to virtual GPIO. The primary mode 1-bit field 1508 follows and indicates that secondary mode bits 1510 are to be transmitted. The secondary mode bits 1510 indicate that the device-skip field 1512 is to be provided. During the device-skip field 1512, the third slave device 708 does not drive the SDA line 904 causing its corresponding device-skip bit 1530 to be read as a binary '1' value, thereby indicating a skip of the third slave device 708. Upon completion of the device-skip field 1512, the master GPIO state information transmission 1518 and un-skipped slave GPIO state information transmissions 1520, 1522, 1524 are transmitted. The GPIO state information transmissions 1518, 1520, 1522, 1524 may include a GPIO state information field 1514 and may be followed by a period of time 1516 during which the clock is stretched.

Figure 16:
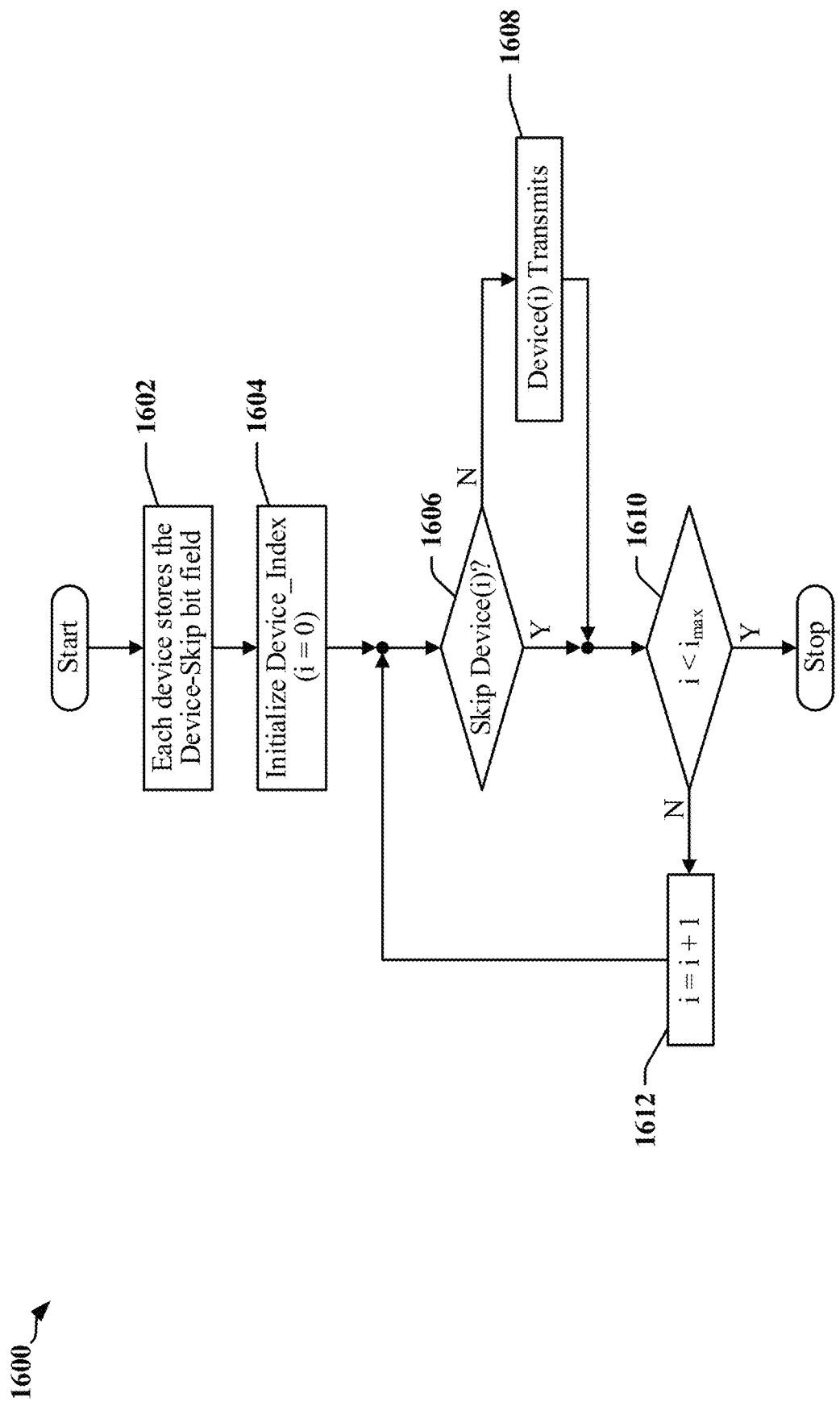
FIG. 16 is a flowchart illustrating an example of a device-skipping procedure in accordance with certain aspects disclosed herein.

FIG. 16 is a flowchart 1600 illustrating an example of a device-skipping procedure in accordance with certain aspects disclosed herein. At block 1602, each device 702, 704, 706, 708, 710 stores the device-skip field 1512. The devices 702, 704, 706, 708, 710 use the device-skip field 1512 to determine which device is currently transmitting GPIO state information. When a device 702, 704, 706, 708, 710 that it is the current transmitter, it may enable its SDA driver and transmit bits of GPIO state information in accordance with the clock signal provided on the SCL line 902.

At block 1604, each device 702, 704, 706, 708, 710 may initialize an internal index that tracks GPIO state transmission sequence. In the illustrated example, the index "i" is set to zero. The index may reference a list of devices 702, 704, 706, 708, 710 in accordance with GPIO state transmission sequence.

At block 1606, each device 702, 704, 706, 708, 710 may determine whether the currently-indexed device 702, 704, 706, 708, 710 is to be skipped based on the content of the device-skip field 1512. If the currently-indexed device 702, 704, 706, 708, 710 is to be skipped, the procedure continues at block 1610. If the currently-indexed device 702, 704, 706, 708, 710 is not to be skipped, the procedure continues to block 1608 where the currently-indexed device 702, 704, 706, 708, 710 transmits its GPIO state bits corresponding to GPIO output pins.

At block 1610, each device 702, 704, 706, 708, 710 may determine whether the currently-indexed device 702, 704, 706, 708, 710 is the last-in-sequence device 702, 704, 706, 708, 710. If the currently-indexed device 702, 704, 706, 708, 710 is the last-in-sequence device, the procedure is terminated. If the currently-indexed device 702, 704, 706, 708, 710 is not the last-in-sequence device, the n the procedure continues at block 1612, where the index is incremented before execution of the procedure resumes at block 1606.

Figure 17:
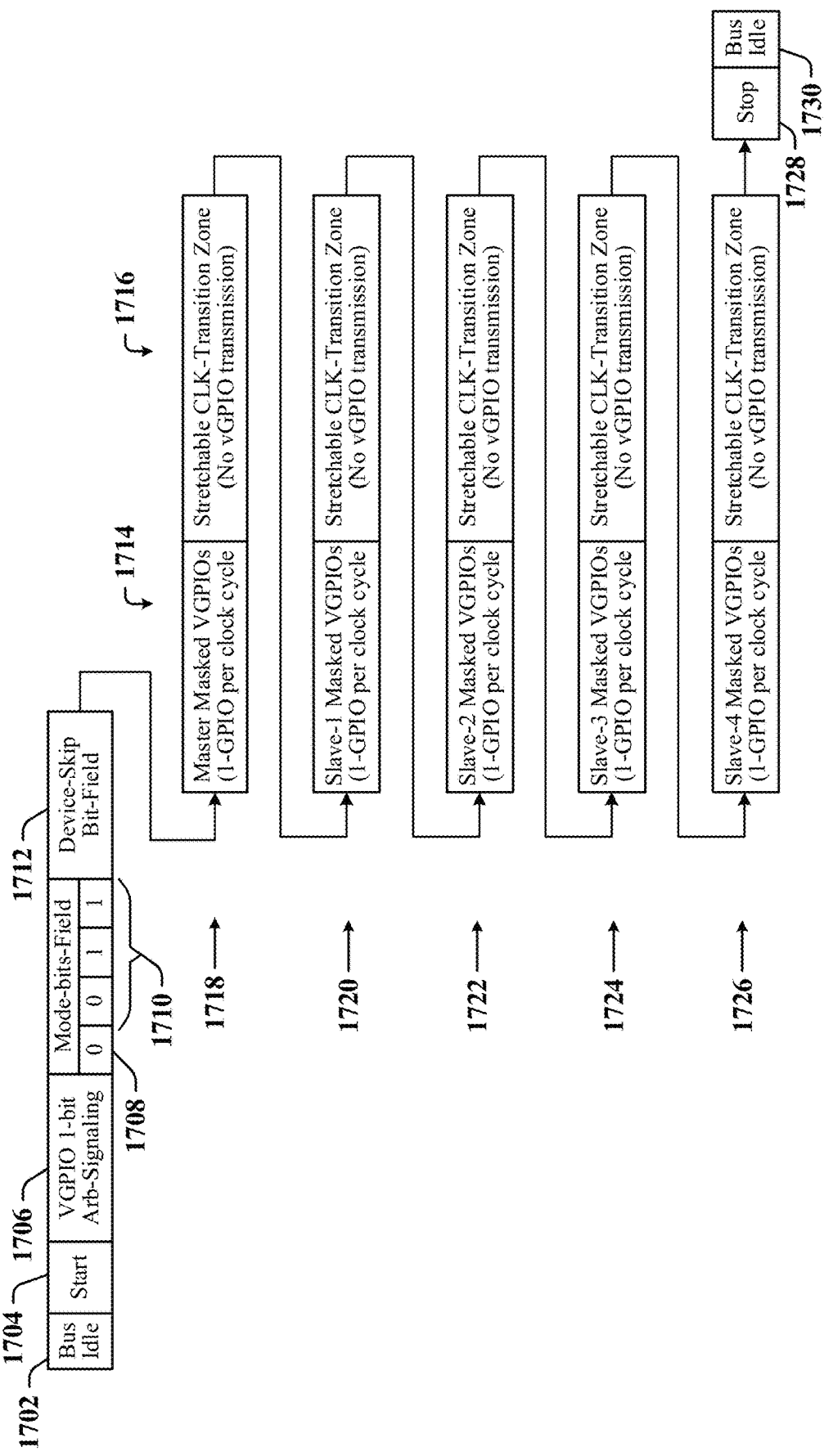
FIG. 17 illustrates an example in which masking is enabled in accordance with certain aspects disclosed herein.

FIG. 17 illustrates an example 1700 in which masking is enabled. A start code 1704 initiates transmission of the virtual GPIO transaction and a stop code 1728 terminates transmission of the virtual GPIO transaction. The multi-drop bus 730 is in an idle state 1702 before transmission of the start code 1704 and returns to the idle state 1730 after transmission of the stop code 1728. An arbitration field 1706 may be transmitted to indicate that the transaction relates to virtual GPIO. The primary mode 1-bit field 1708 follows and indicates that secondary mode bits 1710 are to be transmitted. The secondary mode bits 1710 indicate that mask bits are to be transmitted and that a device-skip field 1712 is to be transmitted. After the device-skip field 1712 has been completed, the master and slave GPIO state information transmissions 1718, 1720, 1722, 1724, 1726 are transmitted. The GPIO state information transmissions 1718, 1720, 1722, 1724, 1726 may include a GPIO state information field 1714 with mask bits, and may be followed by a period of time 1716 during which the clock is stretched. The mask bits may indicate whether corresponding GPIO state bits are to be applied or ignored.

Examples of Processing Circuits and Methods

Figure 18:
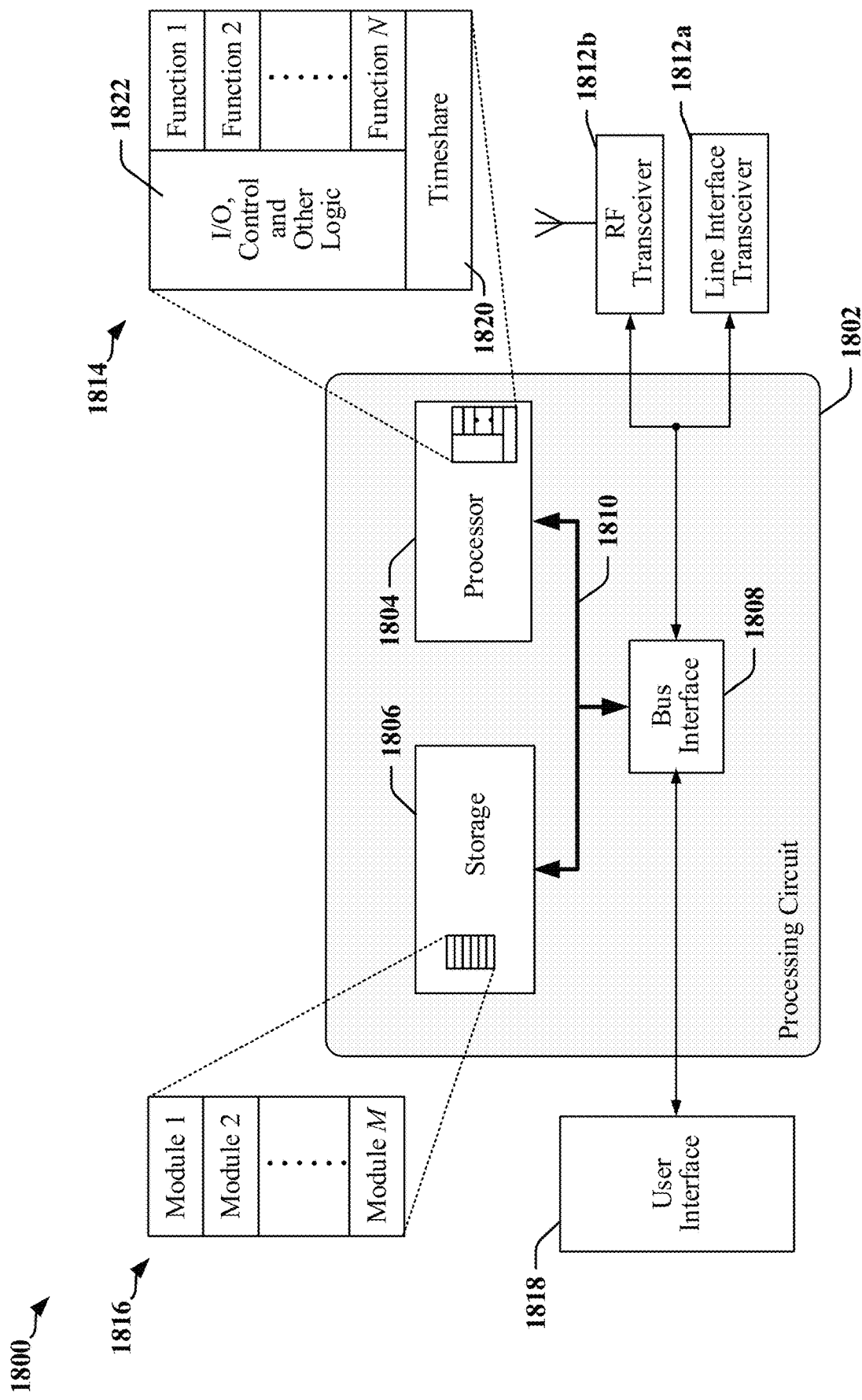
FIG. 18 illustrates an example of an apparatus employing a processing circuit that may be adapted according to certain aspects disclosed herein.

FIG. 18 is a diagram illustrating an example of a hardware implementation for an apparatus 1800 that may include, employ and/or implement a finite state machine 510, 526, 532, 538 of FIG. 5 to exchange virtual GPIO state generated by multiple sources and/or directed to multiple destinations. In some examples, the apparatus 1800 may configure the operation of the finite state machine 510, 526, 532, 538. In some examples, the apparatus 1800 may perform one or more functions disclosed herein. In accordance with various aspects of the disclosure, an element, or any portion of an element, or any combination of elements as disclosed herein may be implemented using a processing circuit 1802. The processing circuit 1802 may include one or more processors 1804 that are controlled by some combination of hardware and software modules. Examples of processors 1804 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1804 may include specialized processors that perform specific functions, and that may be configured, augmented or controlled by one of the software modules 1816. The one or more processors 1804 may be configured through a combination of software modules 1816 loaded during initialization, and further configured by loading or unloading one or more software modules 1816 during operation.

In the illustrated example, the processing circuit 1802 may be implemented with a bus architecture, represented generally by the bus 1810. The bus 1810 may include any number of interconnecting buses and bridges depending on the specific application of the processing circuit 1802 and the overall design constraints. The bus 1810 links together various circuits including the one or more processors 1804, and storage 1806. Storage 1806 may include memory devices and mass storage devices, and may be referred to herein as computer-readable media and/or processor-readable media. The bus 1810 may also link various other circuits such as timing sources, timers, peripherals, voltage regulators, and power management circuits. A bus interface 1808 may provide an interface between the bus 1810 and one or more transceivers 1812*a*, 1812*b*. A transceiver 1812*a*, 1812*b* may be provided for each networking technology supported by the processing circuit. In some instances, multiple networking technologies may share some or all of the circuitry or processing modules found in a transceiver 1812*a*, 1812*b*. Each transceiver 1812*a*, 1812*b* provides a means for communicating with various other apparatus over a transmission medium. In one example, a transceiver 1812*a* may be used to couple the apparatus 1800 to a multi-wire bus. In another example, a transceiver 1812*b* may be used to connect the apparatus 1800 to a radio access network. Depending upon the nature of the apparatus 1800, a user interface 1818 (e.g., keypad, display, speaker, microphone, joystick) may also be provided, and may be communicatively coupled to the bus 1810 directly or through the bus interface 1808.

A processor 1804 may be responsible for managing the bus 1810 and for general processing that may include the execution of software stored in a computer-readable medium that may include the storage 1806. In this respect, the processing circuit 1802, including the processor 1804, may be used to implement any of the methods, functions and techniques disclosed herein. The storage 1806 may be used for storing data that is manipulated by the processor 1804 when executing software, and the software may be configured to implement any one of the methods disclosed herein.

One or more processors 1804 in the processing circuit 1802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1806 or in an external computer-readable medium. The external computer-readable medium and/or storage 1806 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1806 may also include, by way of example, a carrier wave, a transmission line, and any other suitable medium for transmitting software and/or instructions that may be accessed and read by a computer. Computer-readable medium and/or the storage 1806 may reside in the processing circuit 1802, in the processor 1804, external to the processing circuit 1802, or be distributed across multiple entities including the processing circuit 1802. The computer-readable medium and/or storage 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1806 may maintain software maintained and/or organized in loadable code segments, modules, applications, programs, etc., which may be referred to herein as software modules 1816. Each of the software modules 1816 may include instructions and data that, when installed or loaded on the processing circuit 1802 and executed by the one or more processors 1804, contribute to a run-time image 1814 that controls the operation of the one or more processors 1804. When executed, certain instructions may cause the processing circuit 1802 to perform functions in accordance with certain methods, algorithms and processes described herein.

Some of the software modules 1816 may be loaded during initialization of the processing circuit 1802, and these software modules 1816 may configure the processing circuit 1802 to enable performance of the various functions disclosed herein. For example, some software modules 1816 may configure internal devices and/or logic circuits 1822 of the processor 1804, and may manage access to external devices such as the one or more transceivers 1812a, 1812b, the bus interface 1808, the user interface 1818, timers, mathematical coprocessors, and so on. The software modules 1816 may include a control program and/or an operating system that interacts with interrupt handlers and device drivers, and that controls access to various resources provided by the processing circuit 1802. The resources may include memory, processing time, access to the one or more transceivers 1812a, 1812b, the user interface 1818, and so on.

One or more processors 1804 of the processing circuit 1802 may be multifunctional, whereby some of the software modules 1816 are loaded and configured to perform different functions or different instances of the same function. The one or more processors 1804 may additionally be adapted to manage background tasks initiated in response to inputs from the user interface 1818, the one or more transceivers 1812a, 1812b, and device drivers, for example. To support the performance of multiple functions, the one or more processors 1804 may be configured to provide a multitasking environment, whereby each of a plurality of functions is implemented as a set of tasks serviced by the one or more processors 1804 as needed or desired. In one example, the multitasking environment may be implemented using a timesharing program 1820 that passes control of a processor 1804 between different tasks, whereby each task returns control of the one or more processors 1804 to the timesharing program 1820 upon completion of any outstanding operations and/or in response to an input such as an interrupt. When a task has control of the one or more processors 1804, the processing circuit is effectively specialized for the purposes addressed by the function associated with the controlling task. The timesharing program 1820 may include an operating system, a main loop that transfers control on a round-robin basis, a function that allocates control of the one or more processors 1804 in accordance with a prioritization of the functions, and/or an interrupt driven main loop that responds to external events by providing control of the one or more processors 1804 to a handling function.

Figure 19:
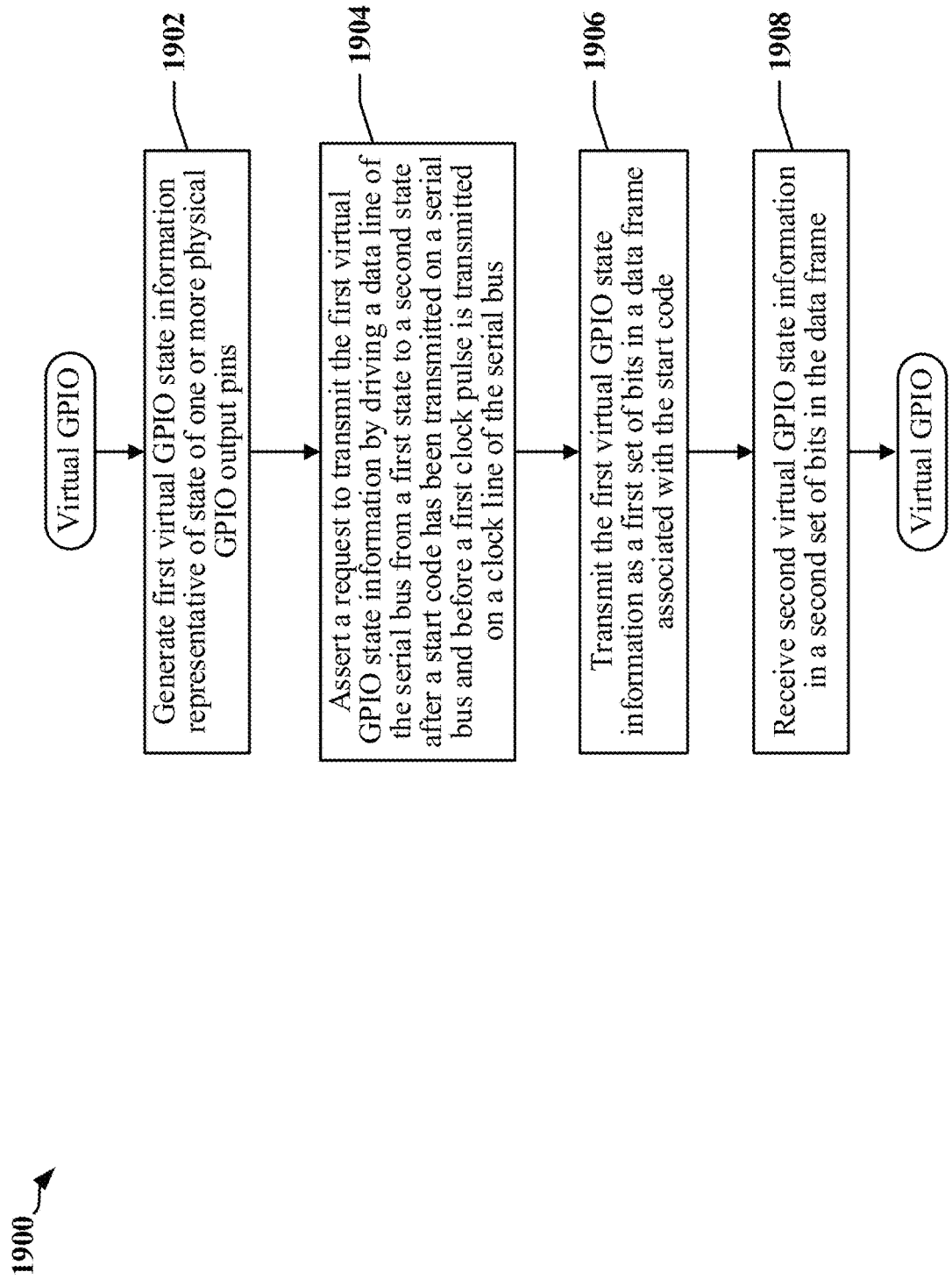
FIG. 19 is a first flowchart illustrating certain operations of an application processor adapted in accordance with certain aspects disclosed herein.

FIG. 19 is a flowchart 1900 illustrating an example of a method for facilitating communication of virtual GPIO messages over a multi-drop bus. In one example, the multi-drop bus is a serial bus operated in accordance with an I3C protocol. The device may be a bus master or a slave device. At block 1902, the device may generate first virtual GPIO state information representative of state of one or more physical GPIO output pins. At block 1904, the device may assert a request to transmit the first virtual GPIO state information by driving a data line of the serial bus from a first state to a second state after a start code has been transmitted on a serial bus and before a first clock pulse is transmitted on a clock line of the serial bus. The device may assert the request to transmit the first virtual GPIO state information before a first pulse is transmitted on the clock line of the serial bus. At block 1906, the device may transmit the first virtual GPIO state information as a first set of bits in a data frame associated with the start code. At block 1908, the device may receive second virtual GPIO state information in a second set of bits in the data frame. The device may modify state of at least one physical GPIO input pin based on the second virtual GPIO state information.

In one example, the device may determine a mode for transmitting the first virtual GPIO state information in a data frame based on a mode field transmitted on the serial bus after the request to transmit the first virtual GPIO state information has been asserted.

In certain examples, a mode field is transmitted on the serial bus after the request to transmit the first virtual GPIO state information has been asserted. The mode field may include a first-transmitted bit that, when set to a first value, causes each of a plurality of devices to transmit virtual GPIO state information in the data frame. When the first-transmitted bit is set to a second value, the device may drive the data line of the serial bus from the first state to the second state in a device-skip field provided after the mode field to indicate intent to transmit the first virtual GPIO state information in the data frame. The device may refrain from driving the data line of the serial bus from the first state to the second state in a device-skip field provided after the mode field to indicate that the first virtual GPIO state information will not be transmitted in the data frame. when the first-transmitted bit is set to the second value, the device may determine that the data line of the serial bus has been driven from the first state to the second state during a bit interval of a device-skip field when the bit interval corresponds to a source of third virtual GPIO state information. The device may thereafter receive the third virtual GPIO state information from the data frame.

In some examples, the first-transmitted bit is set to the second value, and the device may determine that the data line of the serial bus remains in the first state during a bit interval of a device-skip field, where the bit interval corresponds to a source of third virtual GPIO state information. In these examples, the device may receive the second virtual GPIO state information after reducing a previously configured length of the data frame. The location of the second virtual GPIO state information in the data frame may be modified when the length of the data frame is reduced. For example, the second virtual GPIO state information may be transmitted earlier in the data frame.

In various examples, the first-transmitted bit is set to the second value, and the device may configure a mode for transmitting the first virtual GPIO state information and receiving the second virtual GPIO state information based on value of a plurality of bits in the mode field. In one example, the device may transmit the first virtual GPIO state information as a set of one-bit values when the plurality of bits in the mode field has a first value. In another example, the device may transmit the first virtual GPIO state information with a first set of mask bits when the plurality of bits in the mode field has a second value, where each of the first set of mask bits is operable to determine whether corresponding bits in the first set of bits are to be ignored or applied to physical GPIO input pins at a receiver. The device may receive the second virtual GPIO state information as a set of one-bit values when the plurality of bits in the mode field has the first value. The device may receive the second virtual GPIO state information with a second set of mask bits when the plurality of bits in the mode field has the second value. The device may use the second set of mask bits to determine whether corresponding bits in the second set of bits are to be ignored or applied to physical GPIO input pin. In one example, the device may receive the second virtual GPIO state information as a set of one-bit values when the plurality of bits in the mode field has the second value. In some examples, the device may receive the second virtual GPIO state information with a second set of mask bits when the plurality of bits in the mode field has the first value, and may use the second set of mask bits to determine whether corresponding bits in the second set of bits are to be ignored or applied to physical GPIO input pin. In one example, only a bus master device transmits virtual GPIO information when the plurality of bits in the mode field has a third value.

Figure 20:
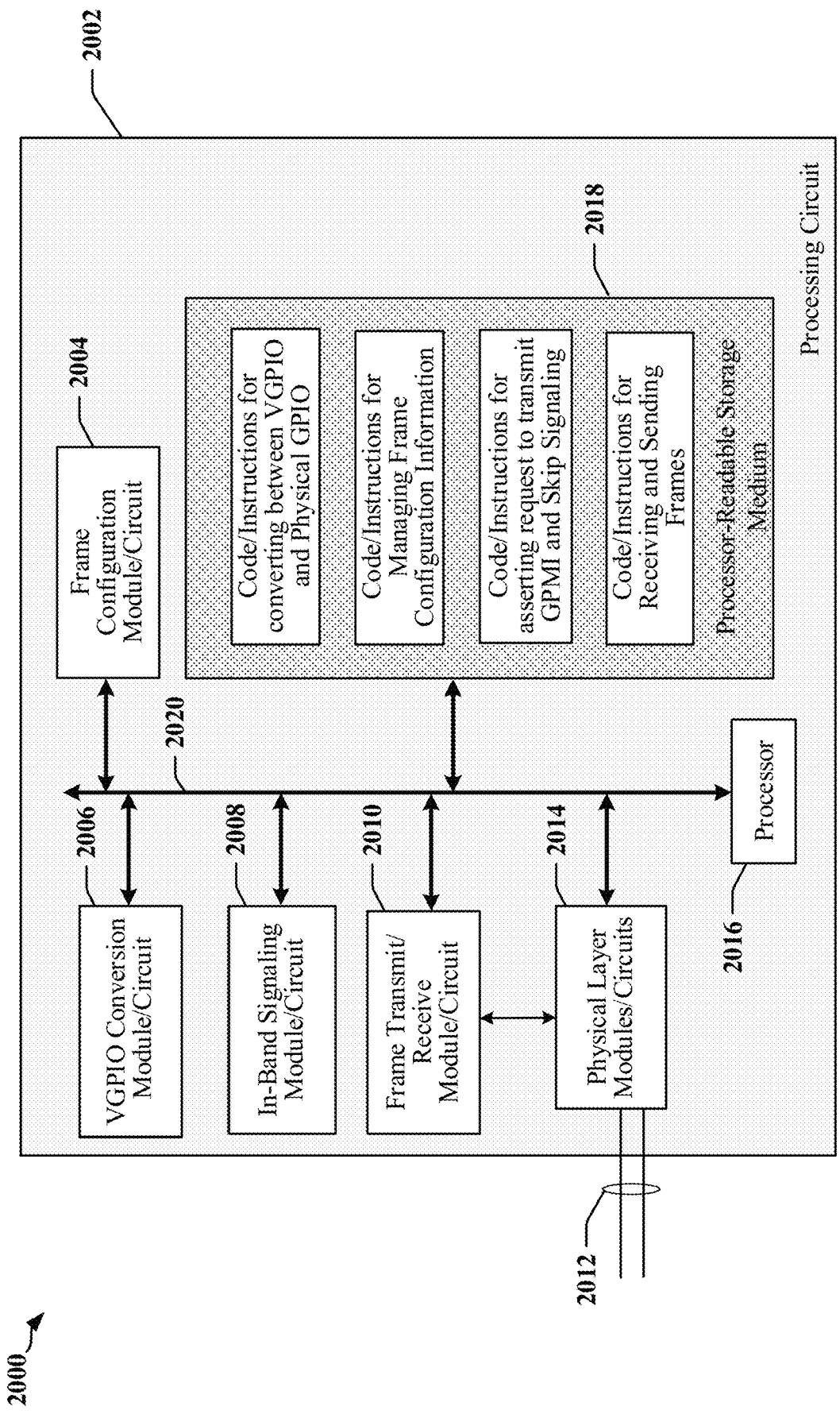
FIG. 20 illustrates a first example of a hardware implementation for an apparatus adapted in accordance with certain aspects disclosed herein.

FIG. 20 is a diagram illustrating an example of a hardware implementation for an apparatus 2000 employing a processing circuit 2002. The apparatus may implement a bridging circuit in accordance with certain aspects disclosed herein. The processing circuit typically has a controller, finite state machine and/or processor 2016 that may include one or more microprocessors, microcontrollers, digital signal processors, sequencers and/or state machines. The processing circuit 2002 may be implemented with a bus architecture, represented generally by the bus 2020. The bus 2020 may include any number of interconnecting buses and bridges depending on the specific application of the processing circuit 2002 and the overall design constraints. The bus 2020 links together various circuits including one or more processors and/or hardware modules, represented by the controller, finite state machine and/or processor 2016, the modules or circuits 2004, 2006, 2008, and 2010 and the processor-readable storage medium 2018. One or more physical layer circuits and/or modules 2014 may be provided to support communications over a communication link implemented using a multi-wire bus 2012 or other communication structure. The bus 2020 may also link various other circuits such as timing sources, peripherals, voltage regulators, and power management circuits, which are well known in the art, and therefore, will not be described any further.

The processing circuit 2002 is responsible for general processing, including the execution of software, code and/or instructions stored on the processor-readable storage medium 2018. The processor-readable storage medium 2018 may include a non-transitory storage medium. The software, when executed by the controller, finite state machine and/or processor 2016, causes the processing circuit 2002 to perform the various functions described supra for any particular apparatus. The processor-readable storage medium 2018 may be used for storing data that is manipulated by the controller, finite state machine and/or processor 2016 when executing software. The processing circuit 2002 further includes at least one of the modules 2004, 2006, 2008, and 2010. The modules 2004, 2006, 2008 and 2010 may be software modules running in the controller, finite state machine and/or processor 2016, resident/stored in the processor-readable storage medium 2018, one or more hardware modules coupled to the controller, finite state machine and/or processor 2016, or some combination thereof. The modules 2004, 2006, 2008, and 2010 may include microcontroller instructions, state machine configuration parameters, or some combination thereof.

In one configuration, the apparatus 2000 includes modules and/or circuits 2004 configured to maintain, update, modify and otherwise manage frame configurations used for communication virtual GPIO information, modules and/or circuits 2006 configured to convert between virtual GPIO information and physical GPIO state, modules and/or circuits 2008 configured to generate and monitor in-band signaling (e.g., signaling provided within a frame or datagram transmitted over a serial bus), and modules and/or circuits 2006 configured to transmit and receive frames and datagrams configured for carrying virtual GPIO information in accordance with certain aspects disclosed herein.

In one example, the apparatus 2000 has an interface adapted to couple the processing circuit 2002 to the multi-wire bus 2012, certain wires of which may operate as a serial bus. The apparatus 2000 may include or use a plurality of GPIO pins. The processing circuit 2002 may be configured to cause the interface to assert a request to transmit first virtual GPIO state information by driving a data line of the serial bus from a first state to a second state after a start code has been transmitted on the serial bus and before a first clock pulse is transmitted on a clock line of the serial bus, transmit the first virtual GPIO state information as a first set of bits in a data frame associated with the start code, and receive second virtual GPIO state information in a second set of bits in the data frame. The processing circuit 2002 may include a finite state machine configured to generate the first virtual GPIO state information based on state of one or more physical GPIO output pins. In one example, the finite state machine may be further configured to modify state of at least one physical GPIO input pin based on the second virtual GPIO state information.

In certain implementations, the processing circuit 2002 is further configured to determine a mode for transmitting the first virtual GPIO state information in a data frame based on a mode field transmitted on the serial bus after the request to transmit the first virtual GPIO state information has been asserted. The mode field transmitted on the serial bus after assertion of the request to transmit the first virtual GPIO state information may include a first-transmitted bit that, when set to a first value, causes each of a plurality of devices to transmit virtual GPIO state information in the data frame.

When the first-transmitted bit may be set to a certain value, the processing circuit 2002 may be further configured to drive the data line of the serial bus from the first state to the second state in a device-skip field provided after the mode field to indicate intent to transmit the first virtual GPIO state information in the data frame, and refrain from driving the data line of the serial bus from the first state to the second state in the device-skip field provided after the mode field to indicate that the first virtual GPIO state information will not be transmitted in the data frame.

When the first-transmitted bit may be set to a certain value, the processing circuit 2002 may be further configured to determine that the data line of the serial bus has been driven from the first state to the second state during a bit interval of a device-skip field, the bit interval corresponding to a source of third virtual GPIO state information, and receive the third virtual GPIO state information from the data frame.

When the first-transmitted bit may be set to a certain value, the processing circuit 2002 may be further configured to determine that the data line of the serial bus remains in the first state during a bit interval of a device-skip field, the bit interval corresponding to a source of third virtual GPIO state information, and receive the second virtual GPIO state information after reducing a previously configured length of the data frame. The location of the second virtual GPIO state information in the data frame may be modified when the length of the data frame is reduced.

When the first-transmitted bit may be set to a certain value, the processing circuit 2002 may be further configured to configure a mode for transmitting the first virtual GPIO state information and receiving the second virtual GPIO state information based on value of a plurality of bits in the mode field, transmit the first virtual GPIO state information as a set of one-bit values when the plurality of bits in the mode field has a first value, and transmit the first virtual GPIO state information with a first set of mask bits when the plurality of bits in the mode field has a second value, each of the first set of mask bits being operable to determine whether corresponding bits in the first set of bits are to be ignored or applied to physical GPIO input pins at a receiver. The processing circuit 2002 may be further configured to receive the second virtual GPIO state information as a set of one-bit values when the plurality of bits in the mode field has the first value, receive the second virtual GPIO state information with a second set of mask bits when the plurality of bits in the mode field has the second value, and use the second set of mask bits to determine whether corresponding bits in the second set of bits are to be ignored or applied to the physical GPIO input pins at the receiver. The processing circuit 2002 may be further configured to receive the second virtual GPIO state information as a set of one-bit values when the plurality of bits in the mode field has the second value. The processing circuit 2002 may be further configured to receive the second virtual GPIO state information with a second set of mask bits when the plurality of bits in the mode field has the first value, and use the second set of mask bits to determine whether corresponding bits in the second set of bits are to be ignored or applied to the physical GPIO input pins at the receiver. In some instances, only a bus master device transmits virtual GPIO information when the plurality of bits in the mode field has a certain value.

In one example, the processor-readable storage medium 2018 stores instructions that, when executed by one or more processors 2016, cause the one or more processors to generate first virtual GPIO state information representative of state of one or more physical GPIO output pins, assert a request to transmit the first virtual GPIO state information by driving a data line of a serial bus from a first state to a second state after a start code has been transmitted on the serial bus and before a first clock pulse is transmitted on a clock line of the serial bus, transmit the first virtual GPIO state information as a first set of bits in a data frame associated with the start code, and receive second virtual GPIO state information in a second set of bits in the data frame.

A mode field may be transmitted on the serial bus after the request to transmit the first virtual GPIO state information has been asserted. The processor-readable storage medium 2018 may include further instructions that cause the one or more processors to drive the data line of the serial bus from the first state to the second state in a device-skip field provided after the mode field to indicate intent to transmit the first virtual GPIO state information in the data frame, and refrain from driving the data line of the serial bus from the first state to the second state in the device-skip field provided after the mode field to indicate that the first virtual GPIO state information will not be transmitted in the data frame.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for facilitating communication of virtual general-purpose input/output (GPIO), comprising:
    generating first virtual GPIO state information representative of state of one or more physical GPIO output pins;
    asserting a request to transmit the first virtual GPIO state information by driving a data line of a serial bus from a first state to a second state after a start code has been transmitted on the serial bus and before a first clock pulse is transmitted on a clock line of the serial bus;
    determining a mode for transmitting the first virtual GPIO state information in a data frame based on a mode field transmitted on the serial bus after the request to transmit the first virtual GPIO state information has been asserted;
    transmitting the first virtual GPIO state information as a first set of bits in the data frame that is transmitted on the serial bus after the start code and after the first clock pulse; and
    receiving second virtual GPIO state information in a second set of bits in the data frame, wherein the mode field transmitted on the serial bus after the request to transmit the first virtual GPIO state information has been asserted comprises a first-transmitted bit that, when set to a first value, causes each of a plurality of devices to transmit virtual GPIO state information in the data frame, and wherein when the first-transmitted bit is set to a second value, the method further comprises:
    driving the data line of the serial bus from the first state to the second state in a device-skip field provided after the mode field to indicate intent to transmit the first virtual GPIO state information in the data frame; and
    refraining from driving the data line of the serial bus from the first state to the second state in the device-skip field provided after the mode field to indicate that the first virtual GPIO state information will not be transmitted in the data frame.

2. The method of claim 1, further comprising:
    modifying state of at least one physical GPIO input pin based on the second virtual GPIO state information.

3. The method of claim 1, wherein when the first-transmitted bit is set to the second value, the method further comprises:
    determining that the data line of the serial bus has been driven from the first state to the second state during a bit interval of the device-skip field, the bit interval corresponding to a source of third virtual GPIO state information; and
    receiving the third virtual GPIO state information from the data frame.

4. The method of claim 1, wherein when the first-transmitted bit is set to the second value, the method further comprises:
   determining that the data line of the serial bus remains in the first state during a bit interval of the device-skip field, the bit interval corresponding to a source of third virtual GPIO state information; and
   receiving the second virtual GPIO state information after reducing a previously configured length of the data frame.

5. The method of claim 4, wherein location of the second virtual GPIO state information in the data frame is modified when the length of the data frame is reduced.

6. The method of claim 1, wherein when the first-transmitted bit is set to the second value, the method further comprises:
   configuring a mode for transmitting the first virtual GPIO state information and receiving the second virtual GPIO state information based on value of a plurality of bits in the mode field;
   transmitting the first virtual GPIO state information as a set of one-bit values when the plurality of bits in the mode field has a first value; and
   transmitting the first virtual GPIO state information with a first set of mask bits when the plurality of bits in the mode field has a second value, each of the first set of mask bits operable to determine whether corresponding bits in the first set of bits are to be ignored or applied to physical GPIO input pins at a receiver.

7. The method of claim 6, further comprising:
   receiving the second virtual GPIO state information as a set of one-bit values when the plurality of bits in the mode field has the first value;
   receiving the second virtual GPIO state information with a second set of mask bits when the plurality of bits in the mode field has the second value; and
   using the second set of mask bits to determine whether corresponding bits in the second set of bits are to be ignored or applied to the physical GPIO input pins at the receiver.

8. The method of claim 6, further comprising:
   receiving the second virtual GPIO state information as a set of one-bit values when the plurality of bits in the mode field has the second value.

9. The method of claim 8, further comprising:
   receiving the second virtual GPIO state information with a second set of mask bits when the plurality of bits in the mode field has the first value; and
   using the second set of mask bits to determine whether corresponding bits in the second set of bits are to be ignored or applied to the physical GPIO input pins at the receiver.

10. The method of claim 6, wherein only a bus master device transmits virtual GPIO information when the plurality of bits in the mode field has a third value.

11. An apparatus comprising:
   a plurality of general-purpose input/output (GPIO) pins;
   an interface adapted to couple the apparatus to a serial bus; and
   a processing circuit configured to:
      cause the interface to assert a request to transmit first virtual GPIO state information by driving a data line of the serial bus from a first state to a second state after a start code has been transmitted on the serial bus and before a first clock pulse is transmitted on a clock line of the serial bus;
      determine a mode for transmitting the first virtual GPIO state information in a data frame based on a mode field transmitted on the serial bus after the request to transmit the first virtual GPIO state information has been asserted;
      transmit the first virtual GPIO state information as a first set of bits in the data frame that is transmitted on the serial bus after the start code and after the first clock pulse; and
      receive second virtual GPIO state information in a second set of bits in the data frame,
   wherein the processing circuit comprises a finite state machine configured to generate the first virtual GPIO state information based on state of one or more physical GPIO output pins, wherein the mode field transmitted on the serial bus after the request to transmit the first virtual GPIO state information has been asserted comprises a first-transmitted bit that, when set to a first value, causes each of a plurality of devices to transmit virtual GPIO state information in the data frame, and wherein when the first-transmitted bit is set to a second value, the processing circuit is further configured to:
      drive the data line of the serial bus from the first state to the second state in a device-skip field provided after the mode field to indicate intent to transmit the first virtual GPIO state information in the data frame; and
      refrain from driving the data line of the serial bus from the first state to the second state in the device-skip field provided after the mode field to indicate that the first virtual GPIO state information will not be transmitted in the data frame.

12. The apparatus of claim 11, wherein the finite state machine is further configured to:
   modify state of at least one physical GPIO input pin based on the second virtual GPIO state information.

13. The apparatus of claim 11, wherein when the first-transmitted bit is set to the second value, the processing circuit is further configured to:
   determine that the data line of the serial bus has been driven from the first state to the second state during a bit interval of the device-skip field, the bit interval corresponding to a source of third virtual GPIO state information; and
   receive the third virtual GPIO state information from the data frame.

14. The apparatus of claim 11, wherein when the first-transmitted bit is set to the second value, the processing circuit is further configured to:
   determine that the data line of the serial bus remains in the first state during a bit interval of the device-skip field, the bit interval corresponding to a source of third virtual GPIO state information; and
   receive the second virtual GPIO state information after reducing a previously configured length of the data frame.

15. The apparatus of claim 14, wherein location of the second virtual GPIO state information in the data frame is modified when the length of the data frame is reduced.

16. The apparatus of claim 11, wherein when the first-transmitted bit is set to the second value, the processing circuit is further configured to:
   configure a mode for transmitting the first virtual GPIO state information and receiving the second virtual GPIO state information based on value of a plurality of bits in the mode field;

transmit the first virtual GPIO state information as a set of one-bit values when the plurality of bits in the mode field has a first value; and transmit the first virtual GPIO state information with a first set of mask bits when the plurality of bits in the mode field has a second value, each of the first set of mask bits operable to determine whether corresponding bits in the first set of bits are to be ignored or applied to physical GPIO input pins at a receiver.

17. The apparatus of claim 16, wherein the processing circuit is further configured to:

receive the second virtual GPIO state information as a set of one-bit values when the plurality of bits in the mode field has the first value;

receive the second virtual GPIO state information with a second set of mask bits when the plurality of bits in the mode field has the second value; and use the second set of mask bits to determine whether corresponding bits in the second set of bits are to be ignored or applied to the physical GPIO input pins at the receiver.

18. The apparatus of claim 16, wherein the processing circuit is further configured to:

receive the second virtual GPIO state information as a set of one-bit values when the plurality of bits in the mode field has the second value.

19. The apparatus of claim 18, wherein the processing circuit is further configured to:

receive the second virtual GPIO state information with a second set of mask bits when the plurality of bits in the mode field has the first value; and use the second set of mask bits to determine whether corresponding bits in the second set of bits are to be ignored or applied to the physical GPIO input pins at the receiver.

20. The apparatus of claim 16, wherein only a bus master device transmits virtual GPIO information when the plurality of bits in the mode field has a third value.

21. A non-transitory processor-readable storage medium comprising instructions that, when executed by one or more processors, cause the one or more processors to:

generate first virtual general-purpose input/output (GPIO) state information representative of state of one or more physical GPIO output pins;

assert a request to transmit the first virtual GPIO state information by driving a data line of a serial bus from a first state to a second state after a start code has been transmitted on the serial bus and before a first clock pulse is transmitted on a clock line of the serial bus;

determine a mode for transmitting the first virtual GPIO state information in a data frame based on a mode field transmitted on the serial bus after the request to transmit the first virtual GPIO state information has been asserted;

transmit the first virtual GPIO state information as a first set of bits in the data frame that is transmitted on the serial bus after the start code and after the first clock pulse; and receive second virtual GPIO state information in a second set of bits in the data frame, wherein the mode field transmitted on the serial bus after the request to transmit the first virtual GPIO state information has been asserted comprises a first-transmitted bit that, when set to a first value, causes each of a plurality of devices to transmit virtual GPIO state information in the data frame, and wherein when the first-transmitted bit is set to a second value, the instructions further cause the one or more processors to:

drive the data line of the serial bus from the first state to the second state in a device-skip field provided after the mode field to indicate intent to transmit the first virtual GPIO state information in the data frame; and refrain from driving the data line of the serial bus from the first state to the second state in the device-skip field provided after the mode field to indicate that the first virtual GPIO state information will not be transmitted in the data frame.

22. An apparatus comprising:

means for generating first virtual general-purpose input/output (GPIO) state information representative of state of one or more physical GPIO output pins;

means for asserting a request to transmit the first virtual GPIO state information by driving a data line of a serial bus from a first state to a second state after a start code has been transmitted on the serial bus and before a first clock pulse is transmitted on a clock line of the serial bus;

means for determining a mode for transmitting the first virtual GPIO state information in a data frame based on a mode field transmitted on the serial bus after the request to transmit the first virtual GPIO state information has been asserted;

means for transmitting the first virtual GPIO state information as a first set of bits in the data frame that is transmitted on the serial bus after the start code and after the first clock pulse; and means for receiving second virtual GPIO state information in a second set of bits in the data frame, wherein the mode field transmitted on the serial bus after the request to transmit the first virtual GPIO state information has been asserted comprises a first-transmitted bit that, when set to a first value, causes each of a plurality of devices to transmit virtual GPIO state information in the data frame, and wherein when the first-transmitted bit is set to a second value, the means for asserting the request drives the data line from the first state to the second state in a device-skip field provided after the mode field to indicate intent to transmit the first virtual GPIO state information in the data frame, and refrains from driving the data line of the serial bus from the first state to the second state in the device-skip field provided after the mode field to indicate that the first virtual GPIO state information will not be transmitted in the data frame.

\* \* \* \* \*